US008701487B2

(12) United States Patent
Naruse et al.

(10) Patent No.: US 8,701,487 B2
(45) Date of Patent: Apr. 22, 2014

(54) ANGULAR VELOCITY DETECTION APPARATUS AND ELECTRONIC INSTRUMENT

(75) Inventors: Hideto Naruse, Okaya (JP); Kenji Sato, Matsumoto (JP); Yutaka Takada, Minami-Minowa-Mura (JP)

(73) Assignee: Seiko Epson Corporation (JP)

( * ) Notice: Subject to any disclaimer, the term of this patent is extended or adjusted under 35 U.S.C. 154(b) by 170 days.

(21) Appl. No.: 13/216,553

(22) Filed: Aug. 24, 2011

(65) Prior Publication Data

US 2012/0055230 A1 Mar. 8, 2012

(30) Foreign Application Priority Data

Sep. 7, 2010 (JP) .................................. 2010-199791

(51) Int. Cl.
*G01C 19/56* (2012.01)

(52) U.S. Cl.
USPC ..................... 73/504.12; 73/504.16; 73/497

(58) Field of Classification Search
USPC ............... 73/504.12, 504.14, 504.16, 504.02, 73/504.04, 504.08, 497
See application file for complete search history.

(56) References Cited

U.S. PATENT DOCUMENTS

| 4,671,112 | A | * | 6/1987 | Kimura et al. | 73/504.16 |
| 4,791,815 | A | * | 12/1988 | Yamaguchi et al. | 73/504.16 |
| 5,131,273 | A | * | 7/1992 | Tabata et al. | 73/504.16 |
| 5,806,364 | A | * | 9/1998 | Kato et al. | 73/504.12 |
| 7,033,071 | B2 | * | 4/2006 | Otsuka | 374/142 |
| 7,069,783 | B2 | * | 7/2006 | Uehara | 73/514.12 |
| 7,216,538 | B2 | * | 5/2007 | Ito et al. | 73/504.12 |
| 7,322,237 | B2 | * | 1/2008 | Kutsuna | 73/504.12 |
| 7,779,687 | B2 | * | 8/2010 | Murashima | 73/504.12 |
| 8,375,790 | B2 | * | 2/2013 | Sato et al. | 73/504.12 |
| 2007/0261488 | A1 | * | 11/2007 | Murashima | 73/504.04 |
| 2010/0011834 | A1 | | 1/2010 | Sato | |
| 2010/0011858 | A1 | | 1/2010 | Sato | |
| 2010/0071466 | A1 | | 3/2010 | Kanai et al. | |

FOREIGN PATENT DOCUMENTS

| JP | 2000-171257 | | 6/2000 |
| JP | 2007-205975 | A | 8/2007 |
| JP | 2009-229171 | A | 10/2009 |
| JP | 2010-025695 | | 2/2010 |
| JP | 2010-025696 | | 2/2010 |
| JP | 2010-107416 | | 5/2010 |

* cited by examiner

*Primary Examiner* — Helen Kwok
(74) *Attorney, Agent, or Firm* — Harness, Dickey & Pierce, P.L.C.

(57) ABSTRACT

An angular velocity detection apparatus includes a vibrator that generates a signal that includes an angular velocity component and a vibration leakage component, a driver section that generates the drive signal, and supplies the drive signal to the vibrator, an angular velocity signal generation section that extracts the angular velocity component from the signal generated by the vibrator, and generates an angular velocity signal corresponding to the magnitude of the angular velocity component, a vibration leakage signal generation section that extracts the vibration leakage component from the signal generated by the vibrator, and generates a vibration leakage signal corresponding to the magnitude of the vibration leakage component, and an adder-subtractor section that adds the vibration leakage signal to the angular velocity signal, or subtracts the vibration leakage signal from the angular velocity signal, in a given ratio to correct temperature characteristics of the angular velocity signal.

8 Claims, 20 Drawing Sheets ptimum # ANGULAR VELOCITY DETECTION APPARATUS AND ELECTRONIC INSTRUMENT

Japanese Patent Application No. 2010-199791, filed on Sep. 7, 2010, is hereby incorporated by reference in its entirety.

BACKGROUND OF THE INVENTION

The present invention relates to an angular velocity detection apparatus and an electronic instrument.

An electronic instrument or a system that includes an angular velocity detection apparatus, and performs a predetermined control process based on the angular velocity detected by the angular velocity detection apparatus has been widely used. For example, a vehicle travel control system prevents a side skid, or detects an overturn, based on the angular velocity detected by the angular velocity detection apparatus.

Such an electronic instrument or system performs wrong control if the angular velocity detection apparatus breaks down. Therefore, measures such as lighting an alarm lamp when the angular velocity detection apparatus has broken down have been employed. Various technologies that diagnose failure of the angular velocity detection apparatus have been proposed. For example, JP-A-2000-171257 focuses on the fact that a signal output from the vibrator of the angular velocity detection apparatus includes an angular velocity component, and a self-vibration component (vibration leakage component) based on excited vibrations of the vibrator, and discloses method that determines the presence or absence of failure of the angular velocity detection apparatus by extracting the vibration leakage component from the signal output from the vibrator, and monitoring the amplitude of the vibration leakage component. JP-A-2010-107416 discloses a failure diagnosis method that reliably generates a self-vibration component by tuning the balance so that the vibration energy of the vibrator becomes imbalanced.

It is ideal that a circuit that extracts the angular velocity component not to extract the vibration leakage component. However, a phase shift of a synchronous detection clock signal occurs due to a circuit production variation, so that the vibration leakage component is included in the extracted angular velocity signal (gyro signal). Therefore, if the vibration leakage component is enhanced as disclosed in JP-A-2010-107416, the temperature characteristics of the angular velocity signal deteriorate due to the effect of the temperature characteristics of the vibration leakage component. If the temperature characteristics of the vibration leakage component are indicated by a linear function or a quadratic function, the temperature characteristics of the vibration leakage component can be corrected using a small-scale temperature compensation circuit. However, the vibration leakage component has temperature characteristics indicated by a higher-order function. The circuit scale necessarily increases when correcting the temperature characteristics of the vibration leakage component using a higher-order function circuit.

SUMMARY

According to a first aspect of the invention, there is provided an angular velocity detection apparatus including:

a vibrator that generates a signal that includes an angular velocity component corresponding to the magnitude of an angular velocity, and a vibration leakage component of vibrations based on a drive signal;

a driver section that generates the drive signal, and supplies the drive signal to the vibrator;

an angular velocity signal generation section that extracts the angular velocity component from the signal generated by the vibrator, and generates an angular velocity signal corresponding to the magnitude of the angular velocity component;

a vibration leakage signal generation section that extracts the vibration leakage component from the signal generated by the vibrator, and generates a vibration leakage signal corresponding to the magnitude of the vibration leakage component; and an adder-subtractor section that adds the vibration leakage signal to the angular velocity signal, or subtracts the vibration leakage signal from the angular velocity signal, in a given ratio to correct temperature characteristics of the angular velocity signal.

According to a second aspect of the invention, there is provided an electronic instrument including the above angular velocity detection apparatus.

DETAILED DESCRIPTION OF THE EMBODIMENT

Figure 1:
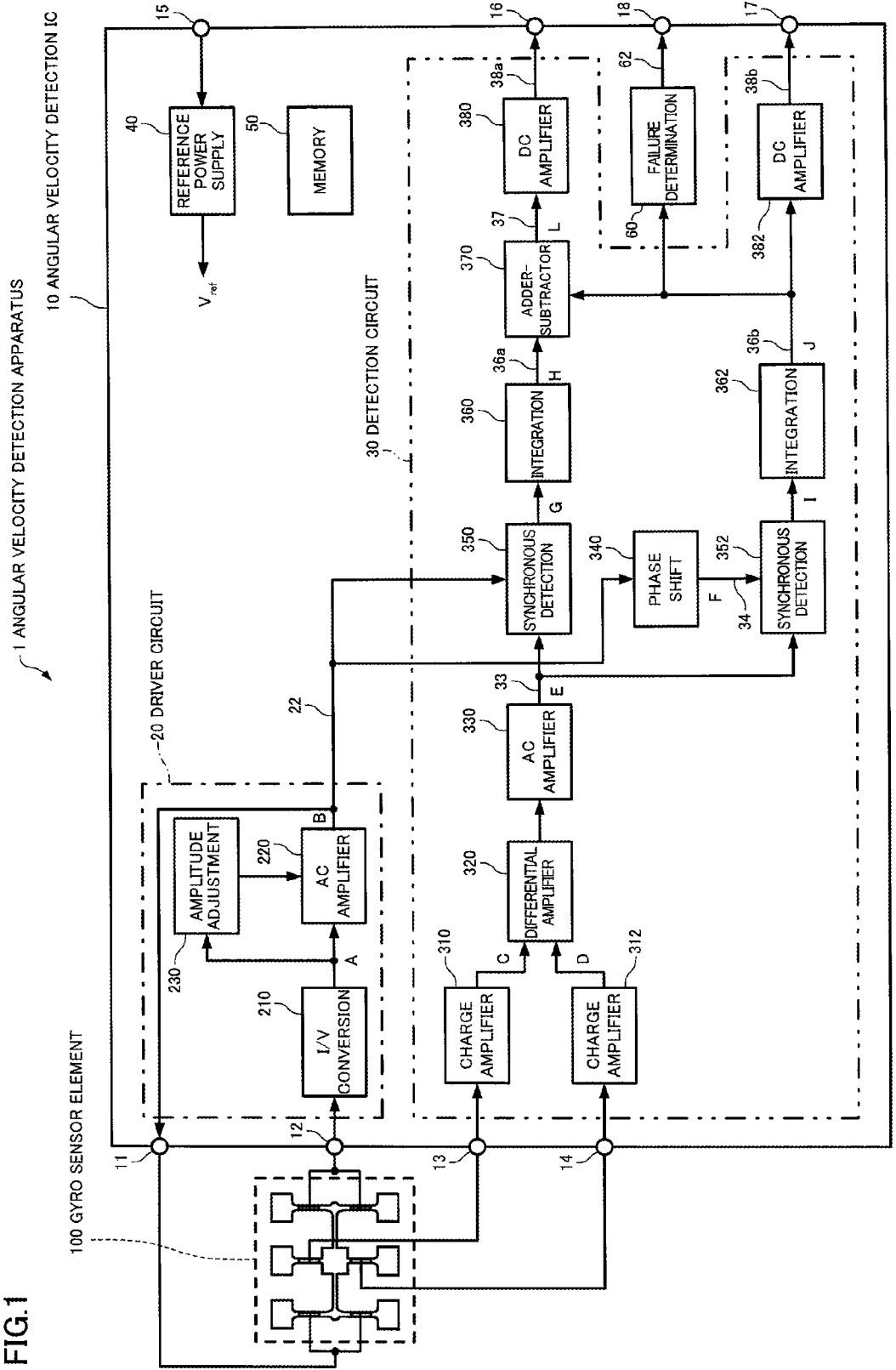
FIG. 1 is a diagram illustrating a configuration example of an angular velocity detection apparatus according to a first embodiment of the invention.

The invention may provide an angular velocity detection apparatus and an electronic instrument that can compensate for a change in temperature characteristics of the angular velocity signal due to the vibration leakage component without using a higher-order temperature compensation circuit.

(1) According to one embodiment of the invention, there is provided an angular velocity detection apparatus including:

a vibrator that generates a signal that includes an angular velocity component corresponding to the magnitude of an angular velocity, and a vibration leakage component of vibrations based on a drive signal;

a driver section that generates the drive signal, and supplies the drive signal to the vibrator;

an angular velocity signal generation section that extracts the angular velocity component from the signal generated by the vibrator, and generates an angular velocity signal corresponding to the magnitude of the angular velocity component;

a vibration leakage signal generation section that extracts the vibration leakage component from the signal generated by the vibrator, and generates a vibration leakage signal corresponding to the magnitude of the vibration leakage component; and an adder-subtractor section that adds the vibration leakage signal to the angular velocity signal, or subtracts the vibration leakage signal from the angular velocity signal, in a given ratio to correct temperature characteristics of the angular velocity signal.

The angular velocity signal generation section may extract the angular velocity component from the signal generated by the vibrator based on a first detection signal that is synchronized with the drive signal, for example. The vibration leakage signal generation section may extract the vibration leakage component from the signal generated by the vibrator based on a second detection signal that is synchronized with the drive signal and differs in phase from the first detection signal, for example.

According to the above embodiment, the temperature characteristics of the angular velocity signal can be corrected by adding the vibration leakage signal to the angular velocity signal, or subtracting the vibration leakage signal from the angular velocity signal, in a given ratio, on the assumption that the temperature characteristics of the angular velocity signal and the temperature characteristics of the vibration leakage signal have a correlation. This makes it possible to compensate for a change in temperature characteristics of the angular velocity signal due to the vibration leakage component without using a higher-order temperature compensation circuit.

(2) The above angular velocity detection apparatus may further include a first first-order temperature adjustment section that adjusts a first-order component of the temperature characteristics of the angular velocity signal input to the adder-subtractor section to approach a first value, and a second first-order temperature adjustment section that adjusts a first-order component of temperature characteristics of the vibration leakage signal input to the adder-subtractor section to approach a second value.

The first value and the second value may be selected based on the relationship between the temperature characteristics of the angular velocity signal and the temperature characteristics of the vibration leakage signal so that the temperature characteristics of the angular velocity signal are corrected by addition or subtraction by the adder-subtractor section. For example, the first value and the second value may be set to an identical value when the temperature characteristic curve of the angular velocity signal and the temperature characteristic curve of the vibration leakage signal bend similarly, and the adder-subtractor section may subtract the vibration leakage signal from the angular velocity signal in the given ratio. The first value and the second value may be set to values that differ in sign and have the same absolute value when the temperature characteristic curve of the angular velocity signal and the temperature characteristic curve of the vibration leakage signal bend in an opposite way, and the adder-subtractor section may add the vibration leakage signal to the angular velocity signal in the given ratio.

This makes it possible to implement a temperature compensation process on the angular velocity signal even when the first-order component of the temperature characteristics of the angular velocity signal and the first-order component of the temperature characteristics of the vibration leakage signal differ to a large extent.

(3) The above angular velocity detection apparatus may further include a first-order temperature adjustment section that adjusts one of a first-order component of the temperature characteristics of the angular velocity signal input to the adder-subtractor section and a first-order component of temperature characteristics of the vibration leakage signal input to the adder-subtractor section to approach the other of the first-order component of the temperature characteristics of the angular velocity signal and the first-order component of the temperature characteristics of the vibration leakage signal.

This makes it possible to implement a temperature compensation process on the angular velocity signal even when the first-order component of the temperature characteristics of the angular velocity signal and the first-order component of the temperature characteristics of the vibration leakage signal differ to a large extent.

(4) The above angular velocity detection apparatus may further include a first-order temperature correction section that corrects a first-order component of temperature characteristics of a signal obtained by the adder-subtractor section.

This makes it possible to implement a more accurate temperature compensation process on the angular velocity signal even when the first-order component of the temperature characteristics of the angular velocity signal and the first-order component of the temperature characteristics of the vibration leakage signal differ to a large extent.

(5) The above angular velocity detection apparatus may further include a terminal that outputs a signal based on the vibration leakage signal to the outside.

The signal based on the vibration leakage signal may be the vibration leakage signal, or may be a signal obtained by performing a specific process (e.g., amplification) on the vibration leakage signal.

The presence or absence of failure of the angular velocity detection apparatus can be externally determined by monitoring the signal based on the vibration leakage signal on the assumption that the amplitude of the vibration leakage component is constant independently of the angular velocity.

(6) The above angular velocity detection apparatus may further include a failure determination section that determines the presence or absence of failure of the angular velocity detection apparatus based on the vibration leakage signal.

This makes it possible for the angular velocity detection apparatus to determine the presence or absence of failure of the angular velocity detection apparatus. If the determination result signal of the failure determination section is output to the outside, the presence or absence of failure of the angular velocity detection apparatus can be externally determined by monitoring the signal output from the failure determination section.

(7) In the above angular velocity detection apparatus, the adder-subtractor section may include an inverting amplifier that inverts a polarity of an input signal, a switch circuit that selects whether or not to bypass the inverting amplifier, and a variable gain amplifier that is disposed in series with the inverting amplifier, and amplifies or attenuates an input signal by a gain that can be variably set, may select whether or not to add a signal obtained by inverting a polarity of the vibration leakage signal to the angular velocity signal using the inverting amplifier and the switch circuit, and may select a ratio of the vibration leakage signal added to the angular velocity signal using the variable gain amplifier.

This makes it possible to select whether or not to invert the polarity of the vibration leakage signal based on the connection setting of the switch circuit, and amplify or attenuate the vibration leakage signal to the desired level based on the gain setting of the variable gain amplifier. Therefore, even if the level or the polarity of the temperature characteristics of the vibration leakage signal varies, the temperature characteristics of the vibration leakage signal can be caused to approach the temperature characteristics of the angular velocity signal or temperature characteristics obtained by inverting the polarity of the temperature characteristics of the angular velocity signal. This makes it possible to implement a temperature compensation process on the angular velocity signal.

(8) According to another embodiment of the invention, there is provided an electronic instrument including the above angular velocity detection apparatus.

Exemplary embodiments of the invention are described in detail below with reference to the drawings. Note that the following embodiments do not unduly limit the scope of the invention as stated in the claims. Note also that all of the elements described below should not necessarily be taken as essential elements of the invention.

1. Angular Velocity Detection Apparatus 1-1. First Embodiment

FIG. 1 is a diagram illustrating a configuration example of an angular velocity detection apparatus according to a first embodiment of the invention.

An angular velocity detection apparatus 1 according to the first embodiment includes a gyro sensor element 100 and an angular velocity detection IC 10.

The gyro sensor element 100 (i.e., vibrator) includes a vibrating element that includes a drive electrode and a detection electrode and is sealed in a package (not shown). The package normally has seal-tightness in order to reduce the impedance of the vibrating element to improve the vibration efficiency as much as possible.

The vibrating element of the gyro sensor element 100 may be formed of a piezoelectric material such as a piezoelectric single crystal (e.g., quartz crystal ($SiO_2$), lithium tantalate ($LiTaO_3$), or lithium niobate ($LiNbO_3$)) or a piezoelectric ceramic (e.g., lead zirconate titanate (PZT)), or may have a structure in which a piezoelectric thin film (e.g., zinc oxide (ZnO) or aluminum nitride (AlN)) is disposed between the drive electrodes on the surface of semiconductor silicon.

In this embodiment, the gyro sensor element 100 is formed using a double-T-shaped vibrating element that includes two T-shaped drive vibrating arms. The vibrating element may have a tuning-fork structure, or a tuning-bar structure in the shape of a triangular prism, a quadrangular prism, or a column, for example.

Figure 2:
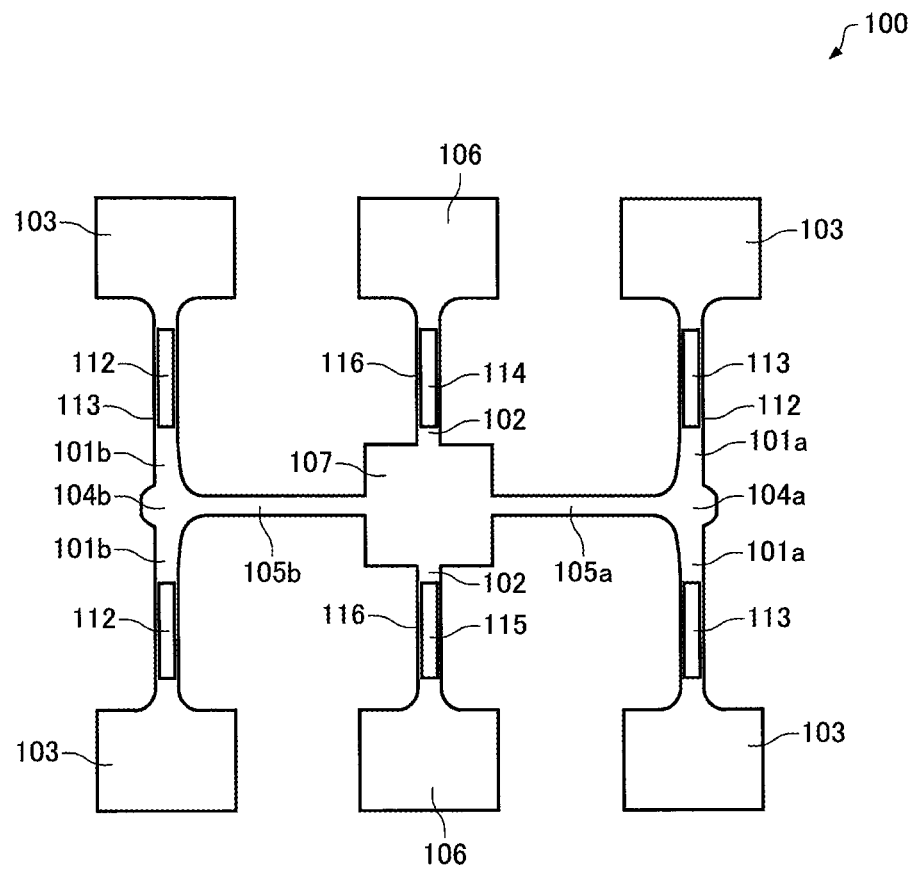
FIG. 2 is a diagram illustrating a vibrating element of a gyro sensor element.

FIG. 2 is a diagram illustrating the vibrating element of the gyro sensor element 100 according to this embodiment.

The gyro sensor element 100 according to this embodiment includes a double-T-shaped vibrating element that is formed using a Z-cut quartz crystal substrate. A vibrating element formed of a quartz crystal has an advantage in that the angular velocity detection accuracy can be improved since the resonance frequency changes to only a small extent due to a change in temperature. Note that the X-axis, the Y-axis, and the Z-axis illustrated in FIG. 2 indicate the axes of the quartz crystal.

As illustrated in FIG. 2, the vibrating element of the gyro sensor element 100 includes drive vibrating arms 101a and 101b that extend respectively from drive bases 104a and 104b in the +Y-axis direction and the −Y-axis direction. Drive electrodes 112 and 113 are respectively formed on the side surface and the upper surface of the drive vibrating arm 101a, and drive electrodes 113 and 112 are respectively formed on the side surface and the upper surface of the drive vibrating arm 101b. The drive electrodes 112 and 113 are connected to a driver circuit 20 respectively via an external output terminal 11 and an external input terminal 12 of the angular velocity detection IC 10 illustrated in FIG. 1.

The drive bases 104a and 104b are connected to a rectangular detection base 107 via connection arms 105a and 105b that respectively extend in the −X-axis direction and the +X-axis direction.

Detection vibrating arms 102 extend from the detection base 107 in the +Y-axis direction and the −Y-axis direction. Detection electrodes 114 and 115 are formed on the upper surface of the detection vibrating arms 102, and common electrodes 116 are formed on the side surface of the detection vibrating arms 102. The detection electrodes 114 and 115 are connected to a detection circuit 30 respectively via external input terminals 13 and 14 of the angular velocity detection IC 10 illustrated in FIG. 1. The common electrodes 116 are grounded.

Figure 3:
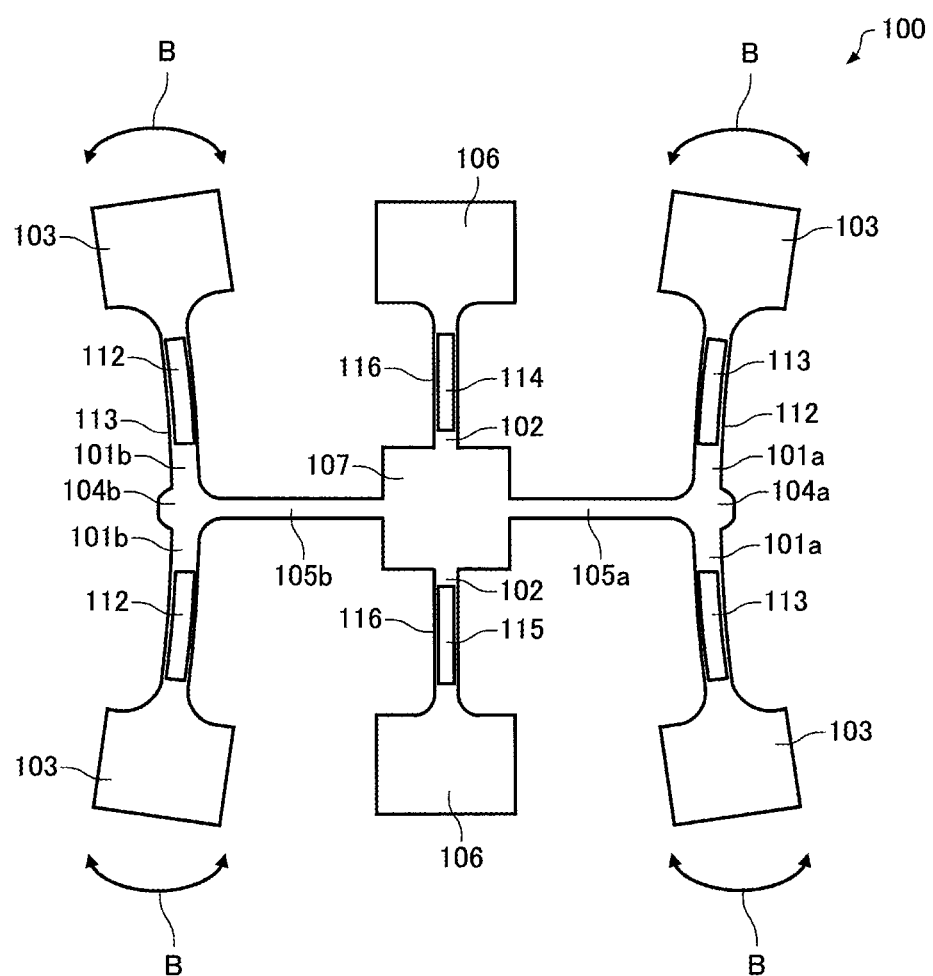
FIG. 3 is a diagram illustrating the operation of a gyro sensor element.

When an alternating voltage (drive signal) is applied between the drive electrodes 112 and 113 of the drive vibrating arms 101a and 101b, the drive vibrating arms 101a and 101b produce flexural vibrations (excited vibrations) so that the ends of the drive vibrating arms 101a and 101b repeatedly move closer and away (see arrow B) due to an inverse piezoelectric effect (see FIG. 3).

Figure 4:
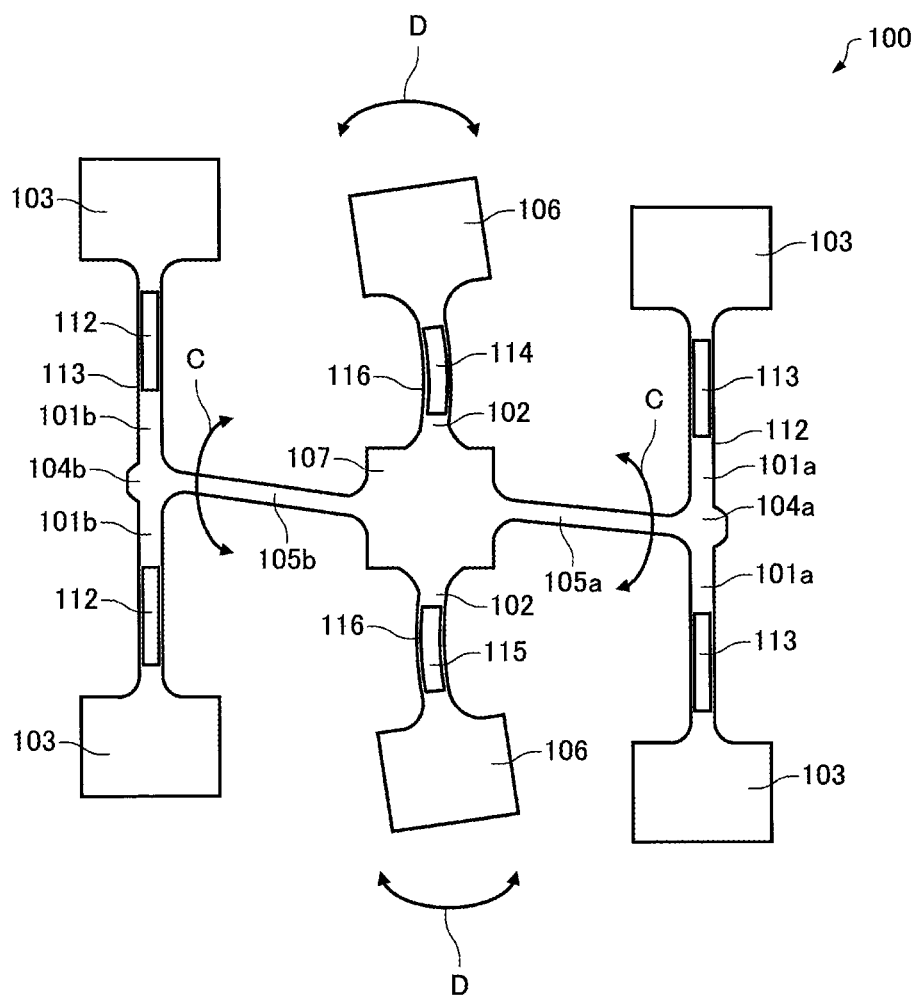
FIG. 4 is a diagram illustrating the operation of a gyro sensor element.

When an angular velocity around the Z-axis is applied to the vibrating element of the gyro sensor element 100, the drive vibrating arms 101a and 101b are subjected to a Coriolis force in the direction that is perpendicular to the direction of the flexural vibrations (see arrow B) and the Z-axis. Therefore, the connection arms 105a and 105b produce vibrations (see arrow C), as illustrated in FIG. 4. The detection vibrating arms 102 produce flexural vibrations (see arrow D) in synchronization with the vibrations (see arrow C) of the connection arms 105a and 105b. The vibrations of the detection vibrating arms 102 based on the Coriolis force differ in phase from the flexural vibrations (excited vibrations) of the drive vibrating arms 101a and 101b by 90°.

The vibration energy of the drive vibrating arms 101a and 101b is balanced when the magnitude of the vibration energy or the vibration amplitude of the drive vibrating arms 101a and 101b is equal when the drive vibrating arms 101a and 101b produce flexural vibrations (excited vibrations), and the detection vibrating arm 102 does not produce flexural vibrations in a state in which an angular velocity is not applied to the gyro sensor element 100. However, when the balance of the vibration energy of the drive vibrating arms 101a and 101b is lost, the detection vibrating arm 102 produces flexural vibrations even if an angular velocity is not applied to the gyro sensor element 100. The above flexural vibrations are referred to as leakage vibrations. The leakage vibrations are flexural vibrations (see arrow D) in the same manner as the vibrations based on the Coriolis force, but occur in the same phase as the drive signal.

An alternating charge based on the flexural vibrations occurs in the detection electrodes 114 and 115 of the detection vibrating arms 102 due to a piezoelectric effect. An alternating charge that is generated based on the Coriolis force changes depending on the magnitude of the Coriolis force (i.e., the magnitude of the angular velocity applied to the gyro sensor element 100). On the other hand, an alternating charge that is generated based on the leakage vibrations is constant independently of the magnitude of the angular velocity applied to the gyro sensor element 100.

A rectangular weight section 103 that is wider than the drive vibrating arms 101a and 101b is formed at the end of the drive vibrating arms 101a and 101b. This makes it possible to increase the Coriolis force while obtaining the desired resonance frequency using relatively short vibrating arms. A weight section 106 that is wider than the detection vibrating arms 102 is formed at the end of the detection vibrating arm 102. This makes it possible to increase the amount of alternating charge that flows through the detection electrodes 114 and 115.

The gyro sensor element 100 thus outputs an alternating charge (i.e., angular velocity component) that is generated based on the Coriolis force and an alternating charge (i.e., vibration leakage component) that is generated based on the leakage vibrations of the excited vibrations via the detection electrodes 114 and 115 (detection axis: Z-axis).

A Coriolis force $F_c$ applied to the gyro sensor element 100 is calculated by the following expression (1):

$$F_c 2mv\Omega \qquad (1)$$

where, m is an equivalent mass, v is a vibration velocity, and omega is an angular velocity. As is clear from the expression (1), the Coriolis force changes due to a change in equivalent mass m or vibration velocity v, even if the angular velocity omega is constant. Specifically, the angular velocity detection sensitivity changes due to a change in equivalent mass m or vibration velocity v. When the vibration state of the vibrating element of the gyro sensor element 100 has changed due to failure, the equivalent mass m or the vibration velocity v of the driving vibrations changes, so that the detection sensitivity changes. The state of the leakage vibrations also changes due to a change in equivalent mass m or vibration velocity v, so that the magnitude of the vibration leakage component changes. Specifically, the magnitude of the vibration leakage component has a correlation with the angular velocity detection sensitivity, and the presence or absence of failure of the gyro sensor element 100 can be determined by monitoring the magnitude of the vibration leakage component.

In this embodiment, the vibration leakage component at the desired level is positively generated by causing the balance of the vibration energy of the drive vibrating arms 101a and 101b to be lost to some extent. In particular, since the gyro sensor element 100 is formed using the double-T-shaped vibrating element, it is easy to cause the flexural vibrations of the drive vibrating arm 101a and the flexural vibrations of the drive vibrating arm 101b to become imbalanced by varying the mass of the weight section 103 at the end of the drive vibrating arm 101a and the weight section 103 at the end of the drive vibrating arm 101b.

Again referring to FIG. 1, the angular velocity detection IC 10 includes the driver circuit 20, the detection circuit 30, a reference power supply circuit 40, and a memory 50.

The driver circuit 20 includes an I/V conversion circuit (current/voltage conversion circuit) 210, an AC amplifier circuit 220, and an amplitude adjustment circuit 230.

The I/V conversion circuit 210 converts a drive current that flows through the vibrating element of the gyro sensor element 100 into an alternating voltage signal.

The alternating voltage signal output from the I/V conversion circuit 210 is input to the AC amplifier circuit 220 and the amplitude adjustment circuit 230. The AC amplifier circuit 220 amplifies the alternating voltage signal input thereto, clips the signal to a predetermined voltage value, and outputs a square-wave voltage signal 22. The amplitude adjustment circuit 230 changes the amplitude of the square-wave voltage signal 22 based on the level of the alternating voltage signal output from the I/V conversion circuit 210, and controls the AC amplifier circuit 220 so that a constant drive current is maintained.

The square-wave voltage signal 22 is supplied to the drive electrode 112 of the vibrating element of the gyro sensor element 100 via the external output terminal 11. The gyro sensor element 100 continuously produces predetermined driving vibrations (see FIG. 3). The drive vibrating arms 101a and 101b of the gyro sensor element 100 produce vibrations at a constant velocity by maintaining a constant drive current. Therefore, the vibration velocity based on which the Coriolis force is produced becomes constant, so that the sensitivity is further stabilized.

The detection circuit 30 includes charge amplifiers 310 and 312, a differential amplifier circuit 320, an AC amplifier circuit 330, a phase shift circuit 340, synchronous detection circuits 350 and 352, integration circuits 360 and 362, an adder-subtractor circuit 370, and DC amplifier circuits 380 and 382.

An alternating charge that includes the angular velocity component and the vibration leakage component is input to the charge amplifier 310 from the detection electrode 114 of the vibrating element of the gyro sensor element 100 via the external input terminal 13.

An alternating charge that includes the angular velocity component and the vibration leakage component is input to the charge amplifier 312 from the detection electrode 115 of the vibrating element of the gyro sensor element 100 via the external input terminal 14.

Each of the charge amplifiers 310 and 312 converts the alternating charge input thereto into an alternating voltage signal based on a reference voltage $V_{ref}$. The reference power supply circuit 40 generates the reference voltage $V_{ref}$ based on an external power supply voltage input via a power supply input terminal 15.

The differential amplifier circuit 320 differentially amplifies the signal output from the charge amplifier 310 and the signal output from the charge amplifier 312. The differential amplifier circuit 320 removes an in-phase component, and amplifies an out-of-phase component.

The AC amplifier circuit 330 amplifies the signal output from the differential amplifier circuit 330. A signal output from the AC amplifier circuit 330 includes the angular velocity component and the vibration leakage component, and is input to the synchronous detection circuits 350 and 352 as a detection target signal 33.

The synchronous detection circuit 350 performs a synchronous detection process on the detection target signal 33 using the square-wave voltage signal 22 as a detection signal. The synchronous detection circuit 350 may be configured as a switch circuit that selects the detection target signal 33 when the voltage level of the square-wave voltage signal 22 is higher than the reference voltage $V_{ref}$, and selects a signal obtained by inverting the detection target signal 33 with respect to the reference voltage $V_{ref}$ when the voltage level of the square-wave voltage signal 22 is lower than the reference voltage $V_{ref}$.

The synchronous detection circuit 352 performs a synchronous detection process on the detection target signal 33 using a square-wave voltage signal 34 that is obtained by delaying the phase of the square-wave voltage signal 22 by 90° using the phase shift circuit 340 as a detection signal. The synchronous detection circuit 352 may be configured as a switch circuit that selects the detection target signal 33 when the voltage level of the square-wave voltage signal 34 is higher than the reference voltage $V_{ref}$, and selects a signal obtained by inverting the detection target signal 33 with respect to the reference voltage $V_{ref}$ when the voltage level of the square-wave voltage signal 34 is lower than the reference voltage $V_{ref}$.

The signal output from the synchronous detection circuit 350 is smoothed into a direct voltage signal by the smoothing circuit 360, and input to the adder-subtractor circuit 370 as an angular velocity signal 36a.

The signal output from the synchronous detection circuit 352 is smoothed into a direct voltage signal by the integration circuit 362, and input to the adder-subtractor circuit 370 and the DC amplifier circuit 382 as a vibration leakage signal 36b.

The adder-subtractor circuit 370 adds the vibration leakage signal 36b to the angular velocity signal 36a, or subtracts the vibration leakage signal 36b from the angular velocity signal 36a in a preset ratio.

The DC amplifier circuit 380 amplifies or attenuates the angular velocity signal 37 that has been corrected in temperature characteristics by the adder-subtractor circuit 370 so that the desired level is achieved. An external apparatus (not shown) can obtain angular velocity information by monitoring the angular velocity signal 38a.

The DC amplifier circuit 382 amplifies or attenuates the vibration leakage signal 36b so that the desired level is achieved, and outputs the resulting signal to the outside as a vibration leakage signal 38b via an external output terminal 17. An external apparatus (not shown) can determine the presence or absence of failure, disconnection, or the like of the gyro sensor element 100 by monitoring the vibration leakage signal 38b.

The angular velocity detection IC 10 may include a failure determination circuit 60 that determines the presence or absence of failure of the angular velocity detection apparatus 1. The failure determination circuit 60 determines the presence or absence of failure of the angular velocity detection apparatus 1 based on the vibration leakage signal 36b, and outputs a failure determination signal 62 to the outside via an external output terminal 18. The failure determination circuit 60 may determine that the angular velocity detection apparatus 1 is normal (without failure) when the amplitude of the vibration leakage signal 36b is within a predetermined range, and may determine that failure has occurred in the angular velocity detection apparatus 1 when the amplitude of the vibration leakage signal 36b is outside the predetermined range, for example. Since the amplitude of the vibration leakage signal 36b varies depending on the sample, a failure determination reference value may be stored in the memory 50.

Note that the driver circuit 20 functions as a driver section. The synchronous detection circuit 350 and the integration circuit 360 function as an angular velocity signal generation section. Note that the synchronous detection circuit 350 and the signal output from the synchronous detection circuit 350 may serve as the angular velocity signal generation section and the angular velocity signal, respectively. The synchronous detection circuit 350 and the integration circuit 360 function as a vibration leakage signal generation section. Note that the synchronous detection circuit 350 and the signal output from the synchronous detection circuit 350 may serve as the vibration leakage signal generation section and the vibration leakage signal, respectively. The adder-subtractor circuit 370 function as an adder-subtractor section. The failure determination circuit 60 functions as a failure determination section.

Figure 5:
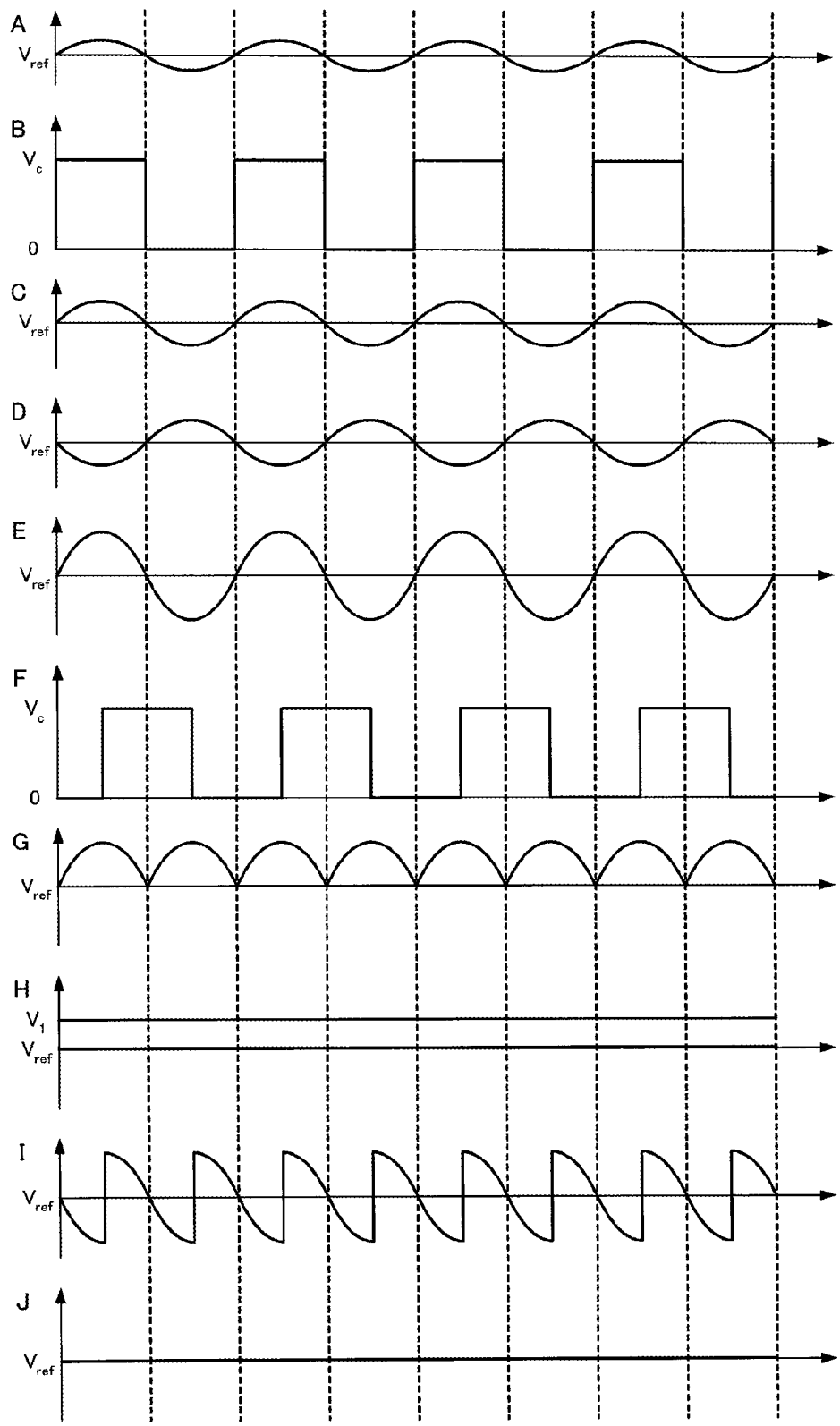
FIG. 5 is a waveform diagram illustrating the angular velocity detection principle.

The angular velocity detection principle of the angular velocity detection apparatus illustrated in FIG. 1 is described below with reference to FIG. 5 (waveform diagram). FIG. 5 illustrates an example of the signal waveforms at points A to J illustrated in FIG. 1. In FIG. 5, the horizontal axis indicates time, and the vertical axis indicates voltage.

When the vibrating element of the gyro sensor element 100 vibrates, an alternating voltage that has a constant frequency and is obtained by converting a current that is fed back from the drive electrode 113 of the vibrating element of the gyro sensor element 100 is generated at the output (point A) of the I/V conversion circuit 210. Specifically, a sine-wave voltage signal that has a constant frequency is generated at the output (point A) of the I/V conversion circuit 210.

The square-wave voltage signal 22 that has a constant amplitude $V_c$ and is obtained by amplifying the signal output from the I/V conversion circuit 210 (signal at the point A) is generated at the output (point B) of the AC amplifier circuit 220.

When an angular velocity is applied to the gyro sensor element 100, a signal that includes the angular velocity component and the vibration leakage component flows through the detection electrodes 114 and 115 of the vibrating element of the gyro sensor element 100. The magnitude of the angular velocity component changes depending on the magnitude of the Coriolis force. On the other hand, the vibration leakage component is constant independently of the magnitude of the angular velocity. FIG. 5 illustrates the signal waveforms that focus only on the angular velocity component since FIG. 5 is used to describe the angular velocity detection principle. The following description also focuses only on the angular velocity component.

The angular velocity components (alternating charge) that flow through the detection electrodes 114 and 115 of the vibrating element of the gyro sensor element 100 are converted into alternating voltage signals by the charge amplifiers 310 and 312. Therefore, sine-wave voltage signals having the same frequency as that of the signal output from the AC amplifier circuit 220 (signal at the point B) are generated at the outputs (points C and D) of the charge amplifiers 310 and 312. The phase of the signal output from the charge amplifier 310 (signal at the point C) is the same as the phase of the signal output from the AC amplifier circuit 220 (signal at the point B). The phase of the signal output from the charge amplifier 312 (signal at the point D) is the reverse of (shifted by 180° from) the phase of the signal output from the charge amplifier circuit 310 (signal at the point C).

The signals output from the charge amplifiers 310 and 312 (signals at the points C and D) are differentially amplified by the differential amplifier circuit 320, and a sine-wave voltage signal that has the same frequency and the same phase as those of the sine-wave voltage signal generated at the output (point C) of the charge amplifier circuit 310 is generated at the output (point E) of the AC amplifier circuit 330. The sine-wave voltage signal that is generated at the output (point E) of the AC amplifier circuit 330 is a signal obtained by amplifying the angular velocity component of the signal that flows through the detection electrodes 114 and 115 of the gyro sensor element 100.

The signal output from the AC amplifier circuit 330 (signal at the point E) is synchronously detected by the synchronous detection circuit 350 based on the square-wave voltage signal 22. Since the phase of the signal output from the AC amplifier circuit 330 (signal at the point E) is the same as the phase of the square-wave voltage signal 22 (signal at the point B), the signal output from the synchronous detection circuit 350 (signal at the point G) is a signal that is obtained by full-wave rectifying the signal output from the AC amplifier circuit 330 (signal at the point E). Therefore, a direct voltage signal (i.e., angular velocity signal 36a) that has a voltage value $V_1$ corresponding to the magnitude of the angular velocity is generated at the output (point H) of the integration circuit 360.

The square-wave voltage signal 34 that is delayed in phase by 90° with respect to the square-wave voltage signal 22 (signal at the point B) is generated at the output (point F) of the phase shift circuit 340, and the signal output from the AC amplifier circuit 330 (signal at the point E) is synchronously detected by the synchronous detection circuit 352 based on the square-wave voltage signal 34. Since the phase of the signal output from the AC amplifier circuit 330 (signal at the point E) is shifted from the phase of the square-wave voltage signal 34 (signal at the point F) by 90°, the signal output from the synchronous detection circuit 352 (signal at the point I) is characterized in that the integral quantity of the voltage that is higher than the reference voltage $V_{ref}$ is equal to the integral quantity of the voltage that is lower than the reference voltage $V_{ref}$. Therefore, the angular velocity component is canceled, and a direct voltage signal that is set at the reference voltage $V_{ref}$ is generated at the output (point J) of the integration circuit 362.

When an angular velocity is applied to the angular velocity detection apparatus 1 in the direction opposite to the direction illustrated in FIG. 5, the waveform of the signal output from the charge amplifier 310 (signal at the point C) and the waveform of the signal output from the charge amplifier 312 (signal at the point D) are inverted with respect to the reference voltage $V_{ref}$. Therefore, the angular velocity signal 36a (signal at the point H) is set at a voltage lower than the reference voltage $V_{ref}$. Since the voltage value of the angular velocity signal 36a is proportional to the magnitude of the Coriolis force (magnitude of the angular velocity), and the polarity of the angular velocity signal 36a is determined by the rotation direction, the angular velocity applied to the angular velocity detection apparatus 1 can be calculated based on the angular velocity signal 36a.

Figure 6:
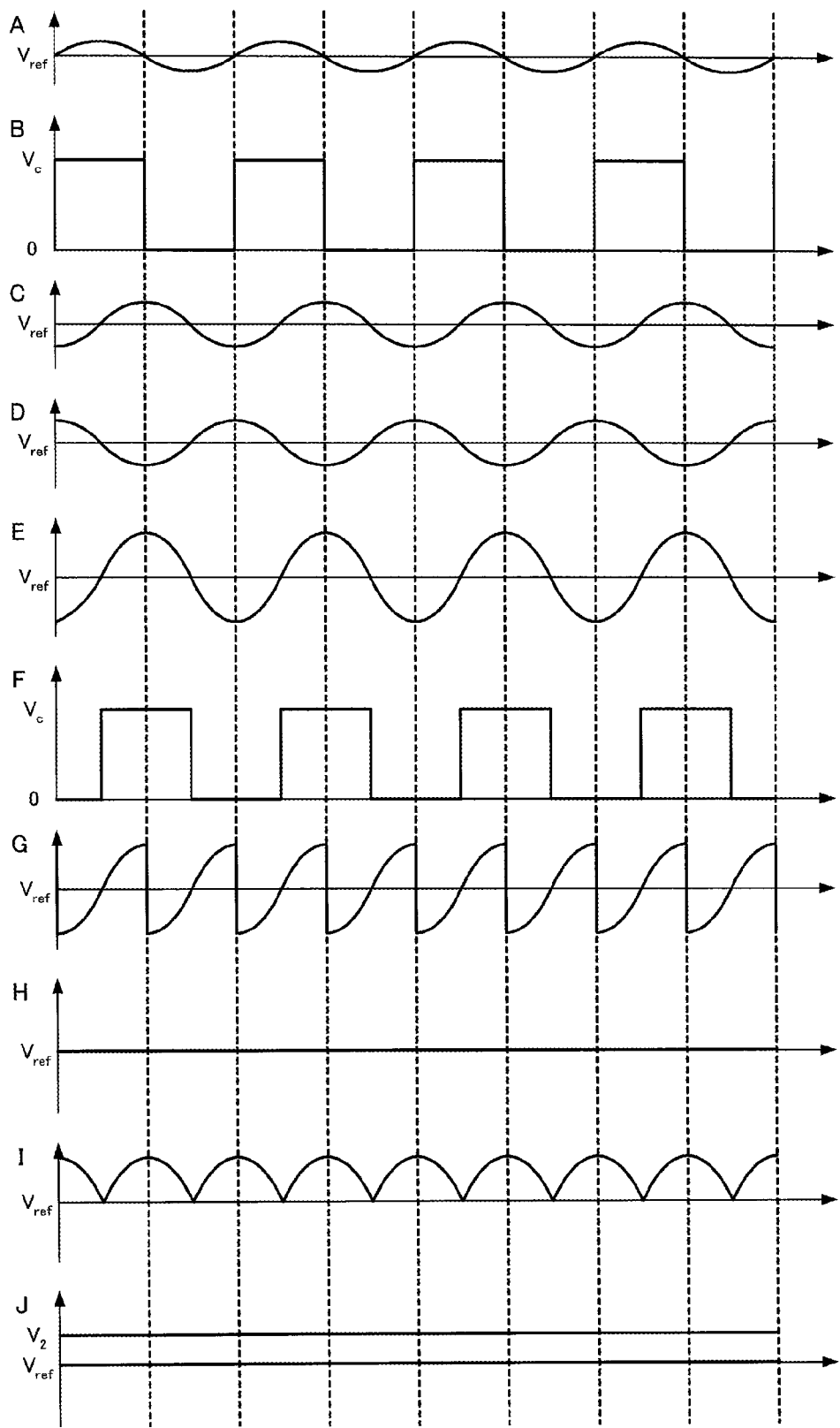
FIG. 6 is a waveform diagram illustrating the vibration leak detection principle.

The vibration leakage detection principle of the angular velocity detection apparatus illustrated in FIG. 1 is described below with reference to FIG. 6 (waveform diagram). FIG. 6 illustrates an example of the signal waveforms at the points A to J illustrated in FIG. 1. In FIG. 6, the horizontal axis indicates time, and the vertical axis indicates voltage.

The signal waveforms at the points A, B, and F are the same as those illustrated in FIG. 5. Therefore, description thereof is omitted. FIG. 5 illustrates the signal waveforms that focus only on the vibration leakage component since FIG. 6 is used to describe the vibration leakage detection principle. The following description also focuses only on the vibration leakage component.

The vibration leakage components (alternating charge) that flow through the detection electrodes 114 and 115 of the vibrating element of the gyro sensor element 100 are converted into alternating voltage signals by the charge amplifier circuits 310 and 312. Therefore, sine-wave voltage signals having the same frequency as that of the signal output from the AC amplifier circuit 220 (signal at the point B) are generated at the outputs (points C and D) of the charge amplifiers 310 and 312. The phase of the signal output from the charge amplifier 310 (signal at the point C) is shifted from the phase of the signal output from the AC amplifier circuit 220 (signal at the point B) by 90°. The phase of the signal output from the charge amplifier 312 (signal at the point D) is the reverse of (shifted by 180° from) the phase of the signal output from the charge amplifier circuit 310 (signal at the point C).

The signals output from the charge amplifiers 310 and 312 (signals at the points C and D) are differentially amplified by the differential amplifier circuit 320, and a sine-wave voltage signal that has the same frequency and the same phase as those of the sine-wave voltage signal generated at the output (point C) of the charge amplifier circuit 310 is generated at the output (point E) of the AC amplifier circuit 330. The sine-wave voltage signal that is generated at the output (point E) of the AC amplifier circuit 330 is a signal obtained by amplifying the vibration leakage component of the signal that flows through the detection electrodes 114 and 115 of the gyro sensor element 100.

The signal output from the AC amplifier circuit 330 (signal at the point E) is synchronously detected by the synchronous detection circuit 350 based on the square-wave voltage signal 22. Since the phase of the signal output from the AC amplifier circuit 330 (signal at the point E) is shifted from the phase of the square-wave voltage signal 22 (signal at the point B) by 90°, the signal output from the synchronous detection circuit 352 (signal at the point I) is characterized in that the integral quantity of the voltage that is higher than the reference voltage $V_{ref}$ is equal to the integral quantity of the voltage that is lower than the reference voltage $V_{ref}$. Therefore, the vibration leakage component is canceled, and a direct voltage signal that is set at the reference voltage $V_{ref}$ is generated at the output (point H) of the integration circuit 360.

The signal output from the AC amplifier circuit 330 (signal at the point E) is synchronously detected by the synchronous detection circuit 352 based on the square-wave voltage signal 34. Since the phase of the signal output from the AC amplifier circuit 330 (signal at the point E) is the same as the phase of the square-wave voltage signal 34 (signal at the point F), the signal output from the synchronous detection circuit 352 (signal at the point I) is a signal that is obtained by full-wave rectifying the signal output from the AC amplifier circuit 330 (signal at the point E). Therefore, a direct voltage signal (i.e., vibration leakage signal 36b) that has a voltage value $V_2$ corresponding to the magnitude of the vibration leakage component is generated at the output (point J) of the integration circuit 362.

The voltage value of the vibration leakage signal 36b is proportional to the magnitude of the vibration leakage component. Since the magnitude of the vibration leakage component is constant when failure has not occurred, the presence or absence of failure of the angular velocity detection apparatus 1 can be determined by monitoring the vibration leakage signal 36b.

An ideal detection principle has been described with reference to FIGS. 5 and 6 on the assumption that the vibration energy of the drive vibrating arms 101a and 101b is balanced, and the phase shift circuit 340 accurately delays the phase by 90°. However, the balance of the vibration energy varies depending on the gyro sensor element, and the phase shifted by the phase shift circuit 340 also varies depending on the IC. Therefore, the vibration leakage component is detected by the synchronous detection circuit 350, and the angular velocity signal 36a includes an offset due to the vibration leakage component. If the offset is constant independently of the temperature, the offset can be corrected by an offset adjustment circuit (zero-point adjustment circuit) (not shown). However, the angular velocity signal 36a does not have flat temperature characteristics. In the angular velocity detection apparatus 1 according to this embodiment, the adder-subtractor circuit 370 is provided in the subsequent stage of the integration circuit 360 to correct the temperature characteristics of the angular velocity signal 36a. Specifically, since the temperature characteristics of the angular velocity signal 36a have a correlation with the temperature characteristics of the vibration leakage signal 36b, the adder-subtractor circuit 370 corrects the temperature characteristics of the angular velocity signal 36a using the vibration leakage signal 36b.

FIGS. 7A to 7C and FIGS. 8A to 8C are graphs illustrating an example of the temperature characteristics of the angular velocity signal 36a and the temperature characteristics of the vibration leakage signal 36b of six samples of the angular velocity detection apparatus 1 when the angular velocity detection apparatus 1 is stationary (i.e., an angular velocity is not applied). In FIGS. 7A to 7C and FIGS. 8A to 8C, the horizontal axis indicates time, and the vertical axis indicates voltage. In FIGS. 7A to 7C and FIGS. 8A to 8C, the solid line indicates the temperature characteristics of the angular velocity signal 36a, and the broken line indicates the temperature characteristics of the vibration leakage signal 36b.

Figure 7A:
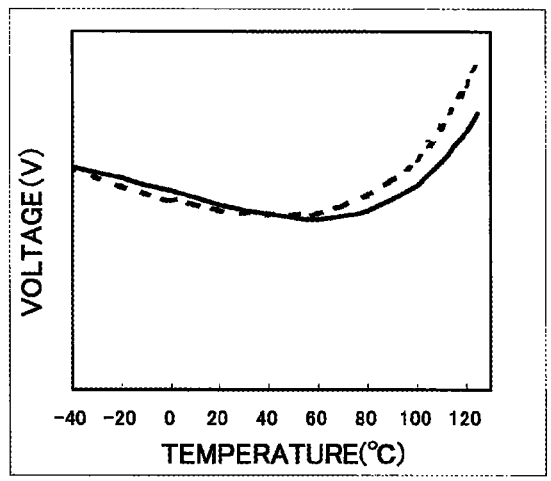
FIGS. 7A to 7C are graphs illustrating an example of the temperature characteristics of an angular velocity signal and the temperature characteristics of a vibration leakage signal.
Figure 7B:
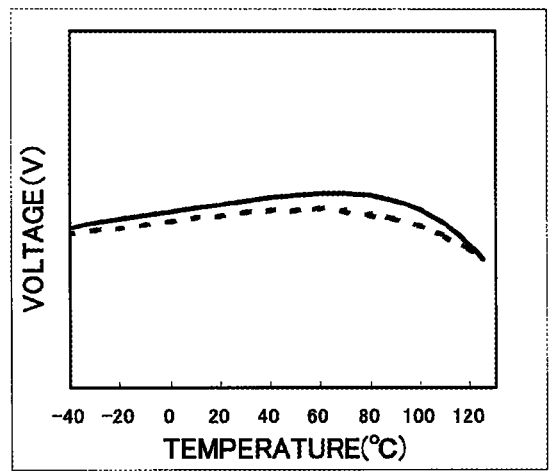
Figure 7C:
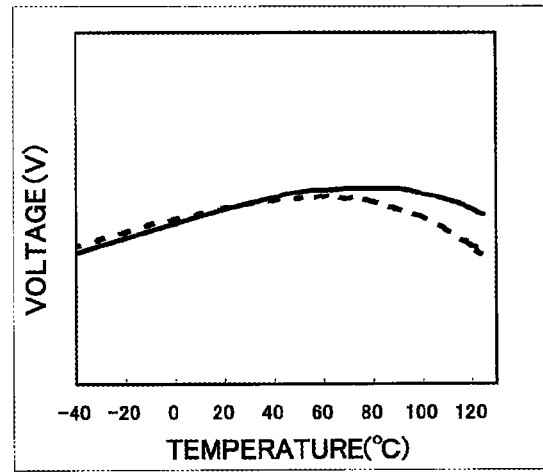
Figure 8A:
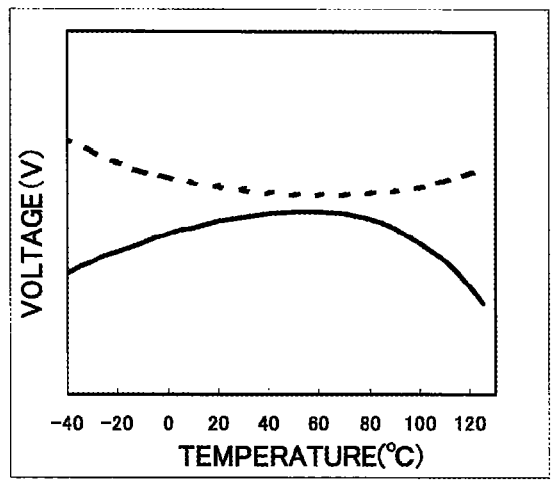
FIGS. 8A to 8C are graphs illustrating an example of the temperature characteristics of an angular velocity signal and the temperature characteristics of a vibration leakage signal.
Figure 8B:
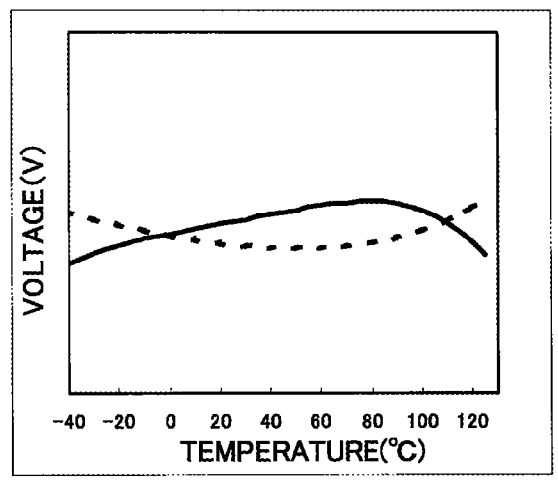
Figure 8C:
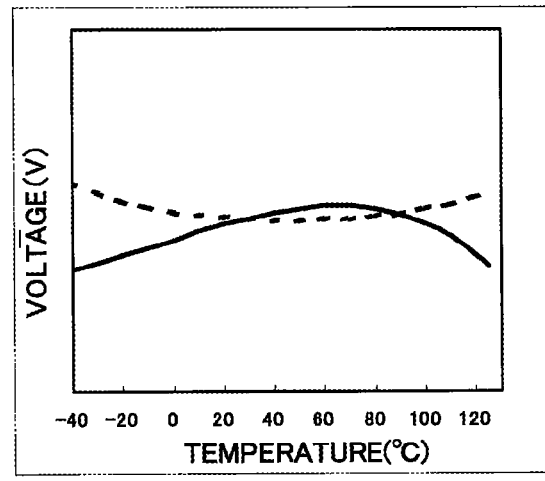

In FIGS. 7A, 7B, and 7C, the temperature characteristic curve of the angular velocity signal 36a is similar to the temperature characteristic curve of the vibration leakage signal 36b. In FIGS. 8A, 8B, and 8C, the temperature characteristic curve of the angular velocity signal 36a is similar to the temperature characteristic curve of the vibration leakage signal 36b if the voltage value of the vibration leakage signal 36b is inverted with respect to the reference voltage $V_{ref}$. However, the difference in voltage between the temperature characteristic curve of the angular velocity signal 36a and the temperature characteristic curve of the vibration leakage signal 36b varies depending on the sample. The temperature characteristics of the angular velocity signal 36a can be corrected using the vibration leakage signal 36b taking account of the similarity between the temperature characteristics of the angular velocity signal 36a and the temperature characteristics of the vibration leakage signal 36b.

Figure 9:
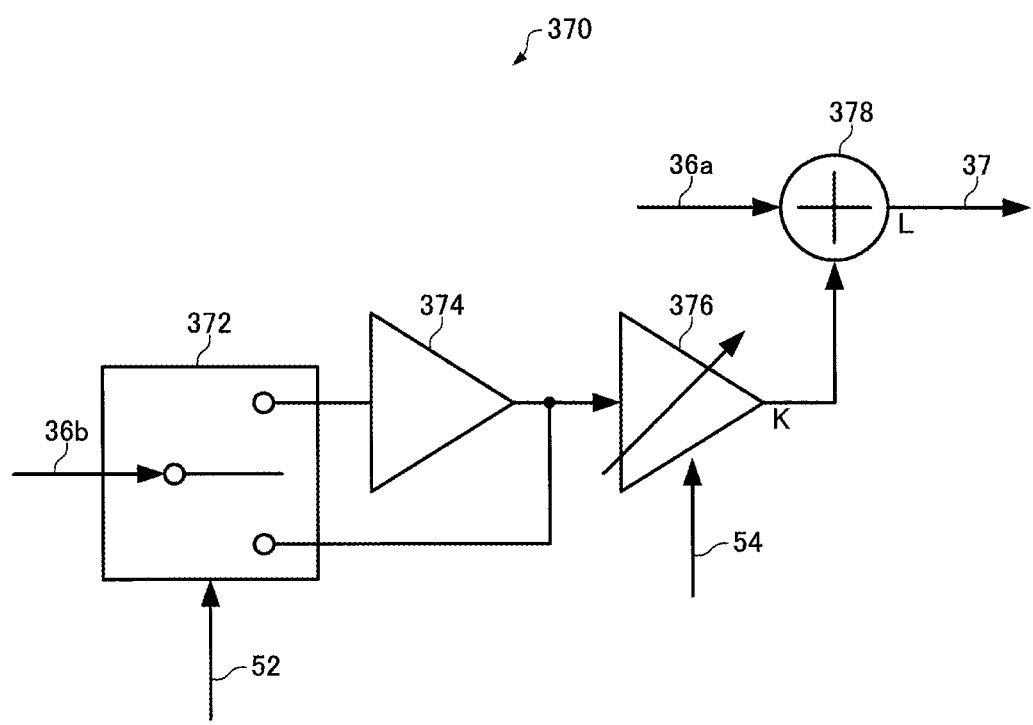
FIG. 9 is a diagram illustrating a configuration example of an adder-subtractor circuit.

FIG. 9 is a diagram illustrating a configuration example of an adder-subtractor circuit 370 that can correct the temperature characteristics of the angular velocity signal 36a. As illustrated in FIG. 9, the adder-subtractor circuit 370 may include a switch circuit 372, an inverting amplifier 374, a variable gain amplifier 376, and an adder 378, for example.

The switch circuit 372 selects whether to input the vibration leakage signal 36b to the inverting amplifier 374 or the variable gain amplifier 376 based on a selection signal 52. For example, a switch setting bit may be stored in the memory 50, and the switch setting bit may be supplied to the switch circuit 372 as the selection signal 52. When the vibration leakage signal 36b is input to the inverting amplifier 374, the vibration leakage signal 36b is inverted in polarity by the inverting amplifier 374 (i.e., the voltage value is inverted with respect to the reference voltage $V_{ref}$), and input to the variable gain amplifier 376. Specifically, the switch circuit 372 selects whether or not to bypass the inverting amplifier 374. Whether to input the vibration leakage signal 36b directly to the variable gain amplifier 376, or input a signal obtained by inverting the polarity of the vibration leakage signal 36b to the variable gain amplifier 376 can be selected using the switch circuit 372.

The variable gain amplifier 376 is an inverting amplifier that amplifies or attenuates the input signal by a gain based on the selection signal 54. For example, gain setting data may be stored in the memory 50, and each bit of the gain setting data may be supplied to the variable gain amplifier 376 as the selection signal 52.

The adder 378 adds the angular velocity signal 36a to the signal output from the variable gain amplifier 376 to generate an angular velocity signal 37.

Figure 10A:
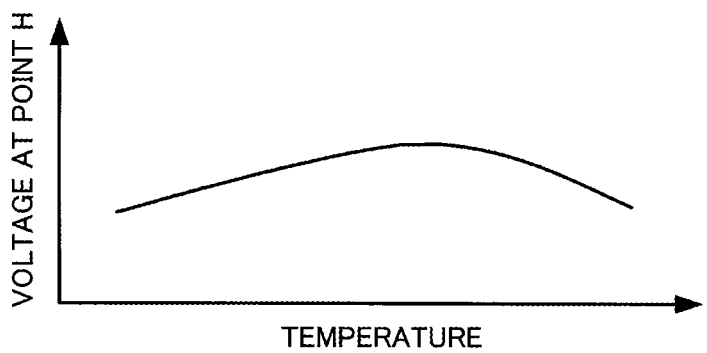
FIGS. 10A to 10D are graphs illustrating an example of correction of the temperature characteristics of an angular velocity signal according to the first embodiment.
Figure 10B:
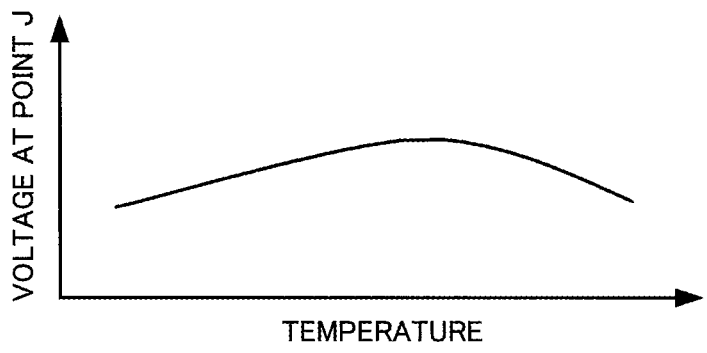
Figure 10C:
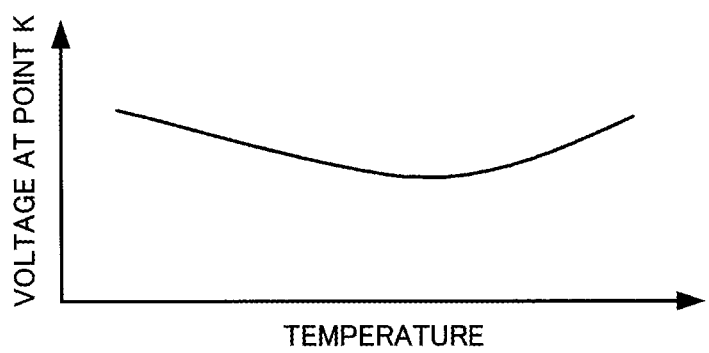
Figure 10D:
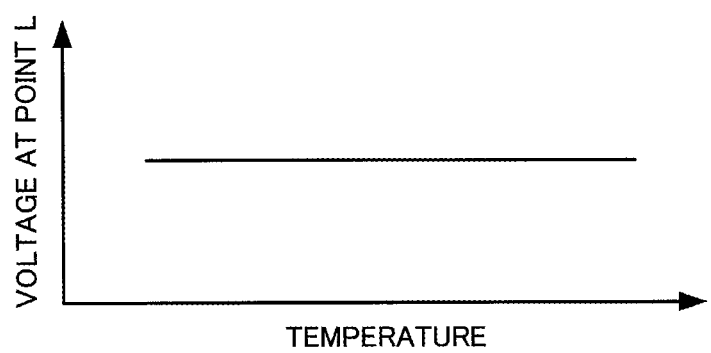

When the adder-subtractor circuit 370 has the configuration illustrated in FIG. 9, and the temperature characteristics of the angular velocity signal 36a are similar to the temperature characteristics of the vibration leakage signal 36b as illustrated in FIGS. 7A to 7C, the temperature characteristics of the angular velocity signal 37 can be made almost flat by setting the selection signal 52 so that the switch circuit 372 bypasses the inverting amplifier 374, and selecting an appropriate value as the gain of the variable gain amplifier 376 using the selection signal 54. For example, when the angular velocity signal 36a (signal at the point H in FIG. 1) has temperature characteristics illustrated in FIG. 10A, and the vibration leakage signal 36b (signal at the point J in FIG. 1) has temperature characteristics illustrated in FIG. 10B, the vibration leakage signal 36b is input to the variable gain amplifier 376, and inverted in polarity. Therefore, the signal output from the variable gain amplifier 376 (output signal at the point K in FIG. 9) has temperature characteristics illustrated in FIG. 10C. Accordingly, the angular velocity signal 37 (output signal at the point L in FIGS. 1 and 9) obtained by adding the angular velocity signal 36a (signal at the point H in FIG. 1) to the signal output from the variable gain amplifier 376 (output signal at the point K in FIG. 9) using the adder 378 has temperature characteristics illustrated in FIG. 10D.

Figure 11A:
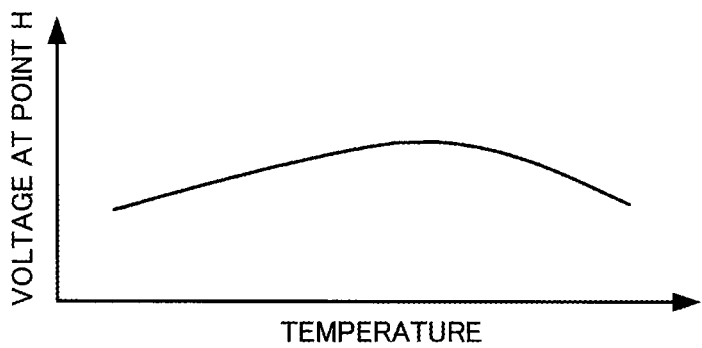
FIGS. 11A to 11D are graphs illustrating an example of correction of the temperature characteristics of an angular velocity signal according to the first embodiment.
Figure 11B:
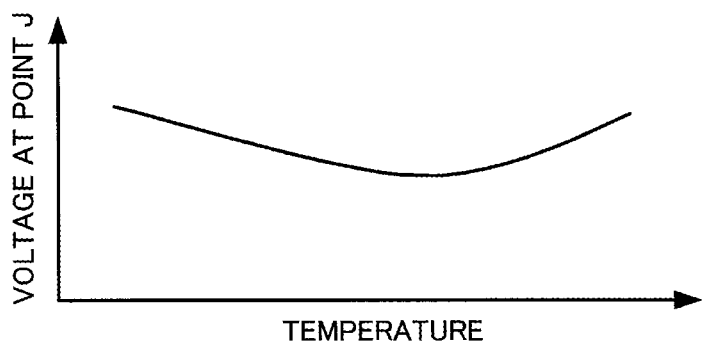
Figure 11C:
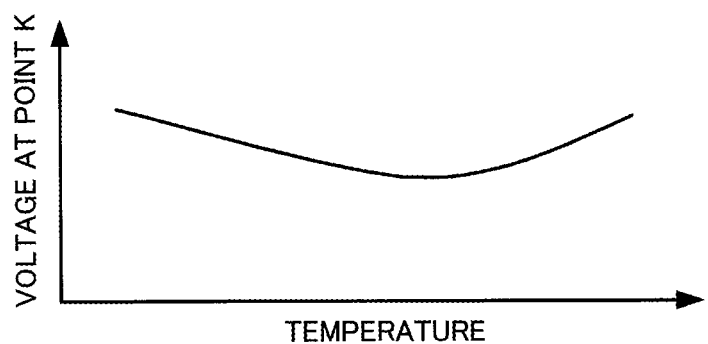
Figure 11D:
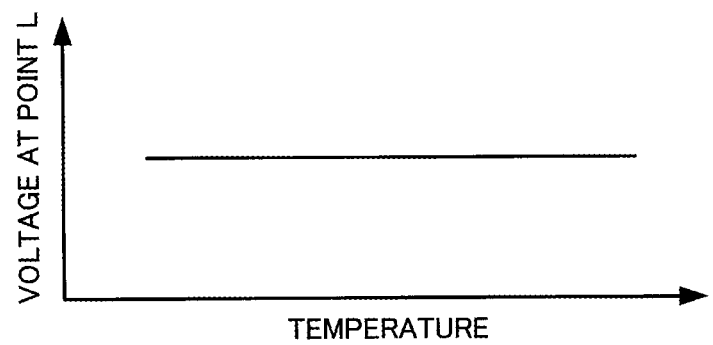

When the temperature characteristics of the angular velocity signal 36a and the temperature characteristics of the vibration leakage signal 36b have the relationship illustrated in FIGS. 8A to 8C, the temperature characteristics of the angular velocity signal 37 can be made almost flat by setting the selection signal 52 so that the switch circuit 372 does not bypass the inverting amplifier 374, and selecting an appropriate value as the gain of the variable gain amplifier 376 using the selection signal 54. For example, when the angular velocity signal 36a (signal at the point H in FIG. 1) has temperature characteristics illustrated in FIG. 11A, and the vibration leakage signal 36b (signal at the point J in FIG. 1) has temperature characteristics illustrated in FIG. 11B, the vibration leakage signal 36b is inverted in polarity by the inverting amplifier 374, and inverted in polarity by the variable gain amplifier 376. Therefore, the signal output from the variable gain amplifier 376 (output signal at the point K in FIG. 9) has temperature characteristics illustrated in FIG. 11C. Accordingly, the angular velocity signal 37 (output signal at the point L in FIGS. 1 and 9) obtained by adding the angular velocity signal 36a (signal at the point H in FIG. 1) to the signal output from the variable gain amplifier 376 (output signal at the point K in FIG. 9) using the adder 378 has temperature characteristics illustrated in FIG. 11D.

According to the angular velocity detection apparatus according to the first embodiment, when the temperature characteristic curve of the angular velocity signal 36a is similar to the temperature characteristic curve of the vibration leakage signal 36b, the temperature characteristic curve of the angular velocity signal 37 can be made almost flat by inverting the polarity of the vibration leakage signal 36b, and adding the resulting signal to the angular velocity signal 36a in a given ratio. When the temperature characteristic curve of the angular velocity signal 36a is opposite to the temperature characteristic curve of the vibration leakage signal 36b, the temperature characteristic curve of the angular velocity signal 37 can be made almost flat by adding the vibration leakage signal 36b to the angular velocity signal 36a in a given ratio without inverting the polarity of the vibration leakage signal 36b. When the temperature characteristic curve of the angular velocity signal 36a differs from the temperature characteristic curve of the vibration leakage signal 36b, an optimum gain at which the temperature characteristic curve of the angular velocity signal 37 becomes almost flat can be selected by allowing the gain of the variable gain amplifier 376 to be adjustable.

Specifically, the angular velocity detection apparatus according to the first embodiment can compensate for a change in temperature characteristics of the angular velocity signal due to the vibration leakage component of the vibrator without using a higher-order temperature compensation circuit.

When using the configuration illustrated in FIG. 9, the switch circuit 372 and the inverting amplifier 374 may be provided in the subsequent stage of the variable gain amplifier 376. Alternatively, a non-inverting amplifier may be used as the variable gain amplifier 376 so that the logic of the selection signal 52 input to the switch circuit 372 is the reverse of that illustrated in FIG. 9. The configuration illustrated in FIG. 1 may be modified so that the signal output from the synchronous detection circuit 350 and the signal output from the synchronous detection circuit 352 are input to the adder-subtractor circuit 370, and the integration circuit 360 is disposed in the subsequent stage of the adder-subtractor circuit 370.

1-2. Second Embodiment

Figure 12:
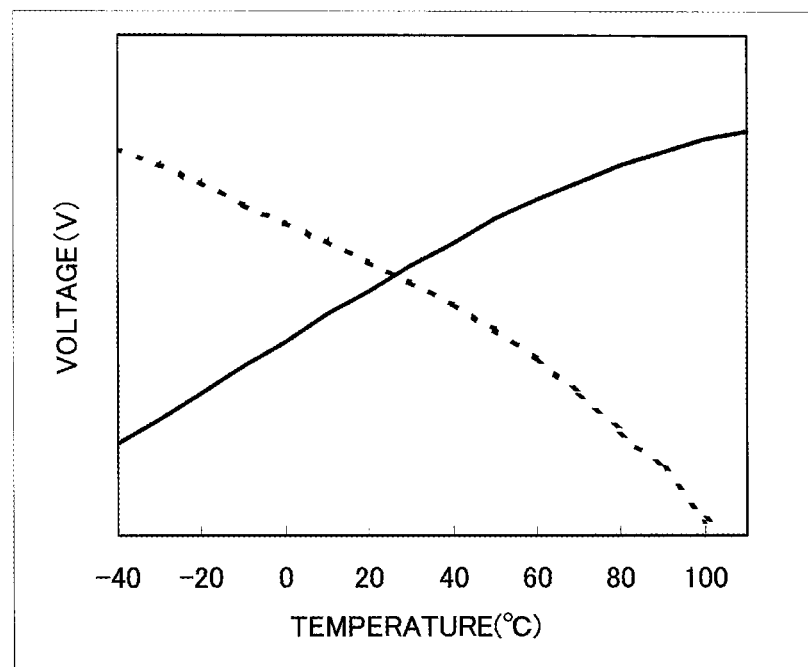
FIG. 12 is a graph illustrating an example of the temperature characteristics of an angular velocity signal and the temperature characteristics of a vibration leakage signal.

In the examples illustrated in FIGS. 7A to 7C and FIGS. 8A to 8C, the temperature characteristics of the angular velocity signal 36a is similar to the temperature characteristics of the vibration leakage signal 36b. FIG. 12 illustrates an example of temperature characteristics that differ in tendency from those illustrated in FIGS. 7A to 7C and FIGS. 8A to 8C. In FIG. 12, the horizontal axis indicates time, and the vertical axis indicates voltage. In FIG. 12, the solid line indicates the temperature characteristics of the angular velocity signal 36a, and the broken line indicates the temperature characteristics of the vibration leakage signal 36b.

In FIG. 12, the temperature characteristics of the angular velocity signal 36a and the temperature characteristics of the vibration leakage signal 36b differ in second-order component and third-order component to only a small extent, but differ in first-order component to a large extent. Therefore, the temperature characteristics of the angular velocity signal 37 do not become flat even if the angular velocity signal 36a and the vibration leakage signal 36b are input to the adder-subtractor circuit 370. In this case, it is considered to be effective to input the angular velocity signal 36a and the vibration leakage signal 36b to the adder-subtractor circuit 370 (i.e., subjected to addition or subtraction) after adjusting the first-order component of the temperature characteristics of the angular velocity signal 36a and the first-order component of the temperature characteristics of the vibration leakage signal 36b to a similar value.

Figure 13:
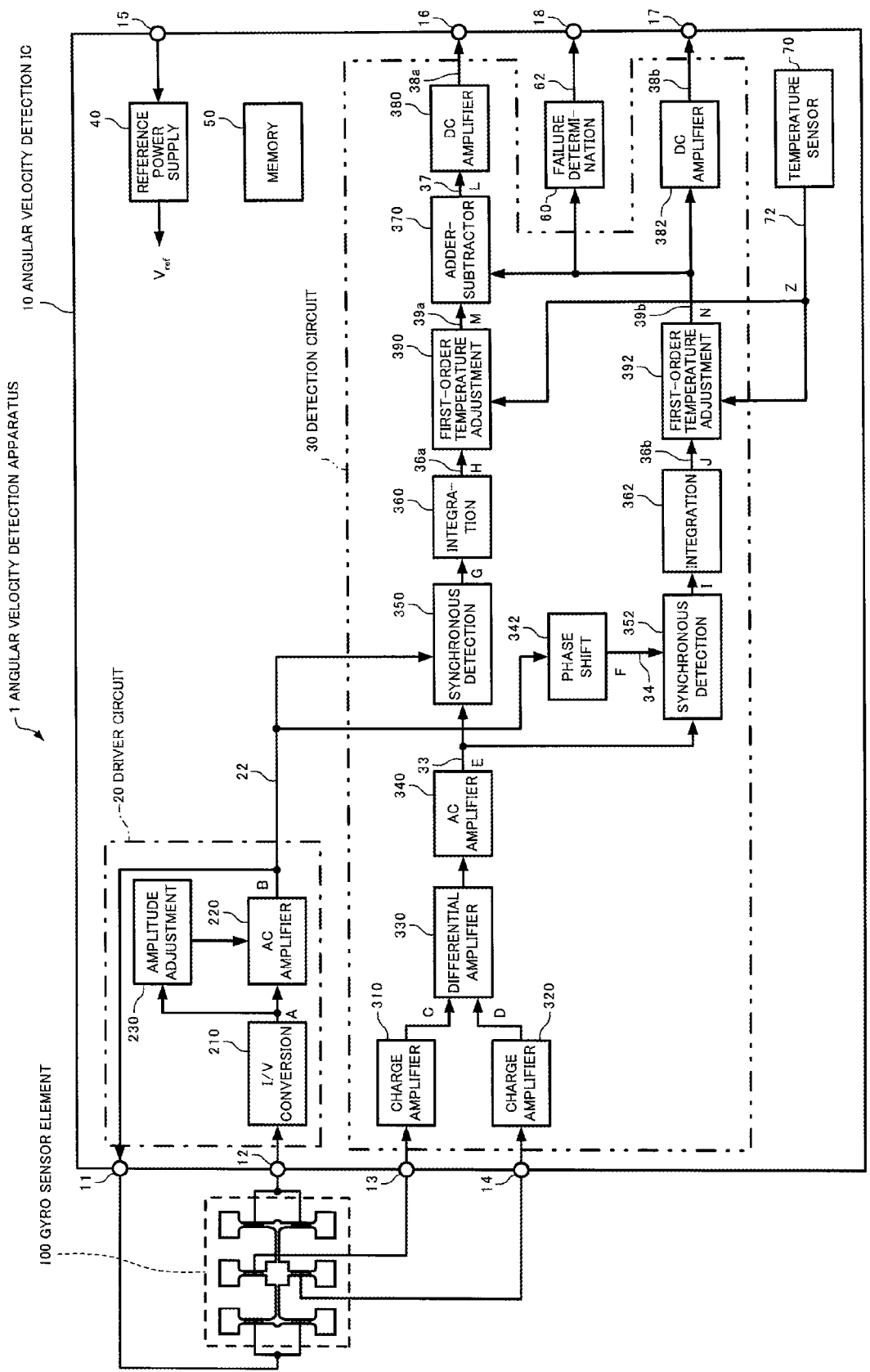
FIG. 13 is a diagram illustrating a configuration example of an angular velocity detection apparatus according to a second embodiment of the invention.

FIG. 13 is a diagram illustrating a configuration example of an angular velocity detection apparatus according to a second embodiment of the invention. In FIG. 13, the same sections as those illustrated in FIG. 1 are indicated by the same symbols. Description of these sections is omitted.

An angular velocity detection apparatus 1 according to the second embodiment includes first-order temperature adjustment circuits 390 and 392 in addition to the configuration illustrated in FIG. 1. The angular velocity detection apparatus 1 according to the second embodiment also includes a temperature sensor 70. Note that the temperature sensor 70 may be provided outside the angular velocity detection IC 10.

The temperature sensor 70 outputs a temperature detection signal 72 that has a linear voltage value with respect to the temperature. The temperature detection signal 72 is input to the first-order temperature adjustment circuits 390 and 392.

The first-order temperature adjustment circuit 390 adjusts the first-order component of the temperature characteristics of the angular velocity signal 36a to approach a first value using the temperature detection signal 72. The first-order temperature adjustment circuit 392 adjusts the first-order component of the temperature characteristics of the vibration leakage signal 36b to approach a second value using the temperature detection signal 72. The first value may be the same as the second value. For example, when the first value and the second value are 0, the first-order temperature adjustment circuit 390 functions as a first-order temperature correction circuit that cancels the first-order component of the temperature characteristics of the angular velocity signal 36a, and the first-order temperature adjustment circuit 392 functions as a first-order temperature correction circuit that cancels the first-order component of the temperature characteristics of the vibration leakage signal 36b. Note that a value other than 0 may be selected as the first value and the second value.

Figure 14:
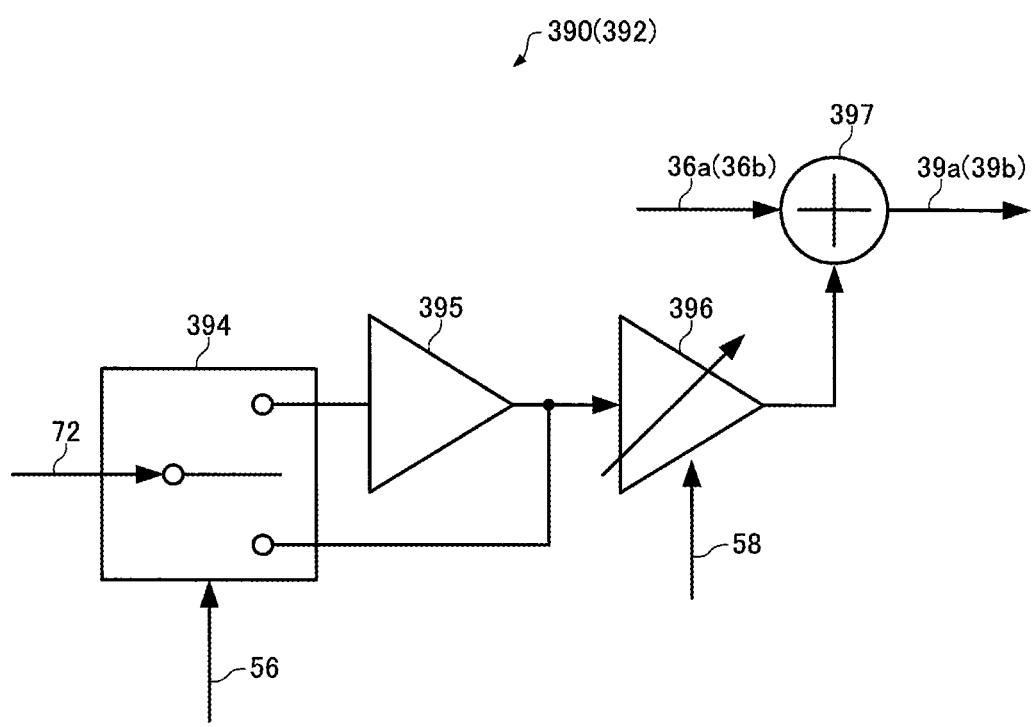
FIG. 14 is a diagram illustrating a configuration example of a first-order temperature adjustment circuit.

The first-order temperature adjustment circuits 390 and 392 may be implemented by circuits having the same configuration. FIG. 14 is a diagram illustrating a configuration example of the first-order temperature adjustment circuit 390 (392). As illustrated in FIG. 14, the first-order temperature adjustment circuit 390 (392) may include a switch circuit 394, an inverting amplifier 395, a variable gain amplifier 396, and an adder 397, for example.

The switch circuit 394 selects whether to input the temperature detection signal 72 to the inverting amplifier 395 or the variable gain amplifier 396 based on a selection signal 56. For example, a switch setting bit may be stored in the memory 50, and the switch setting bit may be supplied to the switch circuit 394 as the selection signal 56. When the temperature detection signal 72 is input to the inverting amplifier 395, the temperature detection signal 72 is inverted in polarity by the inverting amplifier 395, and input to the variable gain amplifier 396. Specifically, the switch circuit 394 selects whether or not to bypass the inverting amplifier 395. Whether to input the temperature detection signal 72 directly to the variable gain amplifier 396, or input a signal obtained by inverting the polarity of the temperature detection signal 72 to the variable gain amplifier 396 can be selected using the switch circuit 394.

The variable gain amplifier 396 is an inverting amplifier that amplifies or attenuates the input signal by a gain based on the selection signal 58. For example, gain setting data may be stored in the memory 50, and each bit of the gain setting data may be supplied to the variable gain amplifier 396 as the selection signal 58.

The adder 397 adds the angular velocity signal 36a or the vibration leakage signal 36b to the signal output from the variable gain amplifier 396 to generate an angular velocity signal 39a or a vibration leakage signal 39b.

The angular velocity signal 39a and the vibration leakage signal 39b are input to the adder-subtractor circuit 370 having the configuration illustrated in FIG. 9, for example. The angular velocity signal 37 having corrected temperature characteristics is thus generated.

Note that the first-order temperature adjustment circuits 390 and 392 function as a first first-order temperature adjustment section and a second first-order temperature adjustment section, respectively.

When the first-order temperature adjustment circuit 390 (392) has the configuration illustrated in FIG. 14, the selection signal 56 is set so that the switch circuit 394 bypasses the inverting amplifier 395 when the polarity (positive or negative) of the slope (first-order component) of the temperature characteristics of the angular velocity signal 36a (vibration leakage signal 36b) is the same as the polarity (positive or negative) of the slope of the temperature detection signal 72 with respect to the temperature. The selection signal 56 is set so that the switch circuit 394 does not bypass the inverting amplifier 395 when the polarity (positive or negative) of the slope (first-order component) of the temperature characteristics of the angular velocity signal 36a (vibration leakage signal 36b) is the reverse of the polarity (positive or negative) of the slope of the temperature detection signal 72 with respect to the temperature. The first-order component of the temperature characteristics of the angular velocity signal 39a (vibration leakage signal 39b) approaches the first value (second value) as a result of selecting an appropriate value as the gain of the variable gain amplifier 396 by appropriately setting the selection signal 58.

Figure 15:
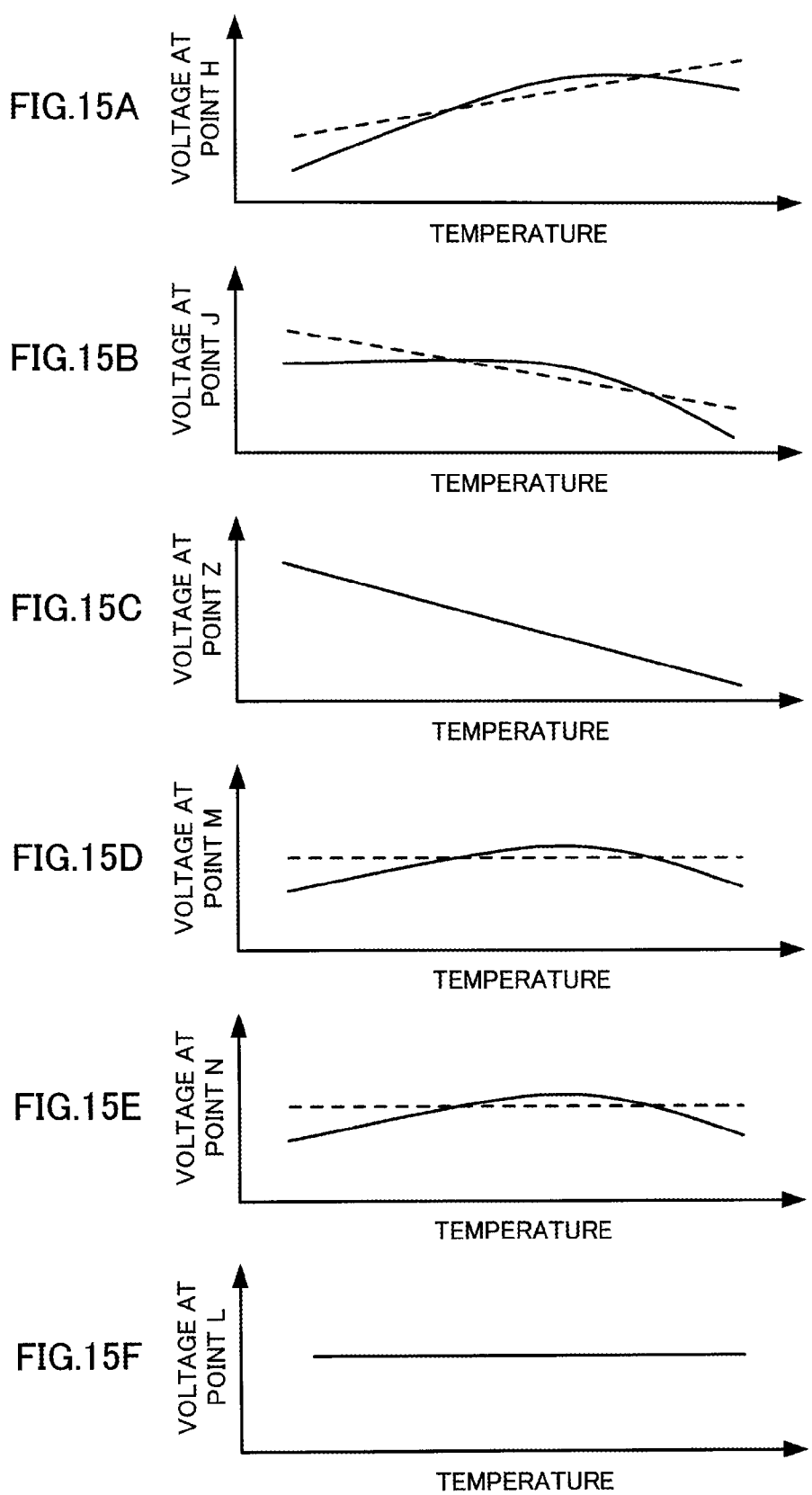
FIGS. 15A to 15F are graphs illustrating an example of correction of the temperature characteristics of an angular velocity signal according to the second embodiment.

For example, when the angular velocity signal 36a (signal at the point H in FIG. 13) has temperature characteristics illustrated in FIG. 15A (solid line), the vibration leakage signal 36b (signal at the point J in FIG. 13) has temperature characteristics illustrated in FIG. 15B (solid line), and the temperature detection signal 72 (signal at the point Z in FIG. 13) has a negative slope with respect to the temperature as illustrated in FIG. 15C, since the first-order component of the temperature characteristics of the angular velocity signal 36a is positive (broken line in FIG. 15A), the temperature detection signal 72 is input to the adder 397 via the variable gain amplifier 396 and the variable gain amplifier 396 of the first-order temperature adjustment circuit 390. The angular velocity signal 39a (signal at the point M in FIG. 13) thus has temperature characteristics illustrated in FIG. 15D (i.e., the first-order component (broken line in FIG. 15D) is adjusted to the first value (e.g., 0)). Since the first-order component of the temperature characteristics of the vibration leakage signal 36b is negative (broken line in FIG. 15B), the temperature detection signal 72 is input to the adder 397 via the variable gain amplifier 396 of the first-order temperature adjustment circuit 390. The vibration leakage signal 36b (signal at the point N in FIG. 13) thus has temperature characteristics illustrated in FIG. 15E (i.e., the first-order component (broken line in FIG. 15E) is adjusted to the second value (e.g., 0)). The angular velocity signal 39a (signal at the point M in FIG. 13) and the vibration leakage signal 39b (signal at the point N in FIG. 13) are then input to the adder-subtractor circuit 370, so that the angular velocity signal 37 (signal at the point L in FIG. 13) having almost flat temperature characteristics (see FIG. 15F) is generated.

According to the angular velocity detection apparatus according to the second embodiment, even if the first-order component of the temperature characteristics of the angular velocity signal 36a differs from the first-order component of the temperature characteristics of the vibration leakage signal 36b, the first-order component of the temperature characteristics of the angular velocity signal 36a and the first-order component of the temperature characteristics of the vibration leakage signal 36b can be adjusted to approach (ideally coincide) using the first-order temperature adjustment circuits 390 and 392, and the temperature characteristics of the angular velocity signal can then be corrected by the adder-subtractor circuit 370. This makes it possible to correct various combinations of the first-order component of the temperature characteristics of the angular velocity signal 36a and the first-order component of the temperature characteristics of the vibration leakage signal 36b as compared with the first embodiment.

When using the configuration illustrated in FIG. 14, the switch circuit 394 and the inverting amplifier 395 may be provided in the subsequent stage of the variable gain amplifier 396. Alternatively, a non-inverting amplifier may be used as the variable gain amplifier 396 so that the logic of the selection signal 56 input to the switch circuit 394 is the reverse of that illustrated in FIG. 14. In FIG. 13, the first-order temperature adjustment circuit 390 may be disposed between the synchronous detection circuit 350 and the integration circuit 360. Likewise, the first-order temperature adjustment circuit 392 may be disposed between the synchronous detection circuit 352 and the integration circuit 362.

1-3. Third Embodiment

Figure 16:
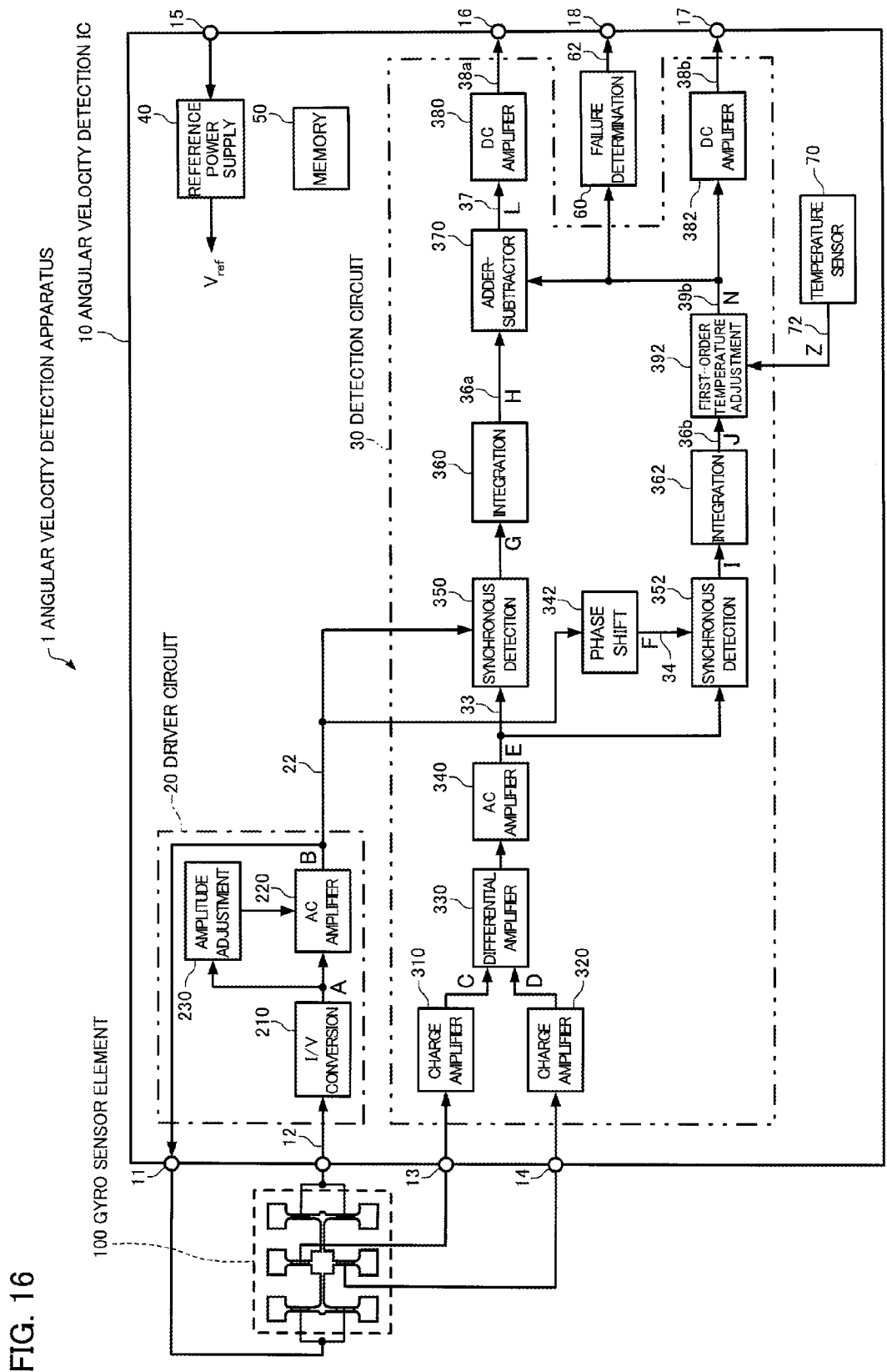
FIG. 16 is a diagram illustrating a configuration example of an angular velocity detection apparatus according to a third embodiment of the invention.

FIG. 16 is a diagram illustrating a configuration example of an angular velocity detection apparatus according to a third embodiment of the invention. In FIG. 16, the same sections as those illustrated in FIG. 13 are indicated by the same symbols. Description of these sections is omitted.

An angular velocity detection apparatus 1 according to the third embodiment has a configuration in which the first-order temperature adjustment circuit 390 is omitted from the configuration illustrated in FIG. 13. The first-order temperature adjustment circuit 392 adjusts the first-order component of the temperature characteristics of the vibration leakage signal 36b to approach the first-order component of the temperature characteristics of the angular velocity signal 36a based on the temperature detection signal 72. The first-order temperature adjustment circuit 392 may be configured in the same manner as in FIG. 14. The first-order temperature adjustment circuit 392 functions as a first-order temperature adjustment section.

Figure 17A:
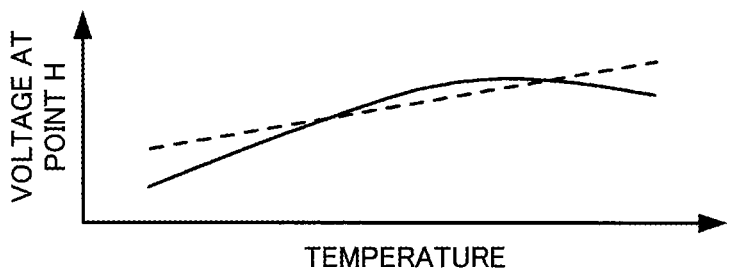
FIGS. 17A to 17E are graphs illustrating an example of correction of the temperature characteristics of an angular velocity signal according to the third embodiment.
Figure 17B:
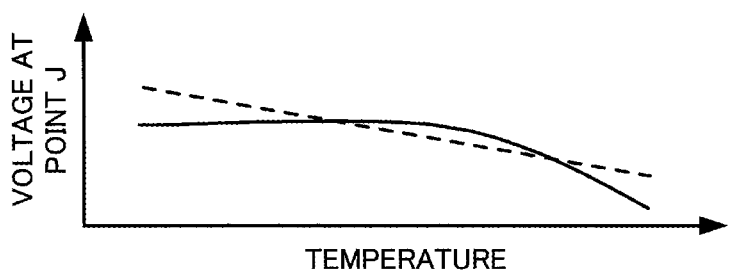
Figure 17C:
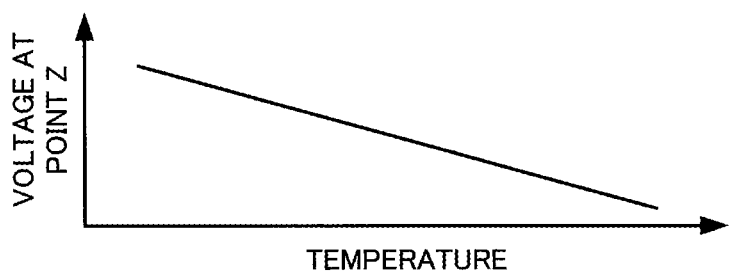
Figure 17D:
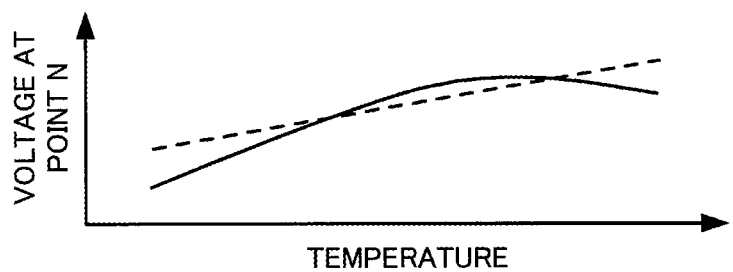
Figure 17E:
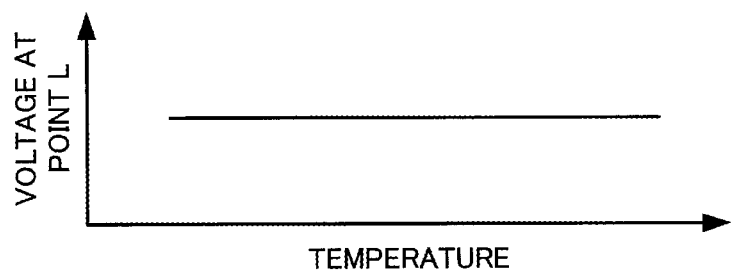

When the angular velocity signal 36a (signal at the point H in FIG. 16) has temperature characteristics illustrated in FIG. 17A (solid line), the vibration leakage signal 36b (signal at the point J in FIG. 16) has temperature characteristics illustrated in FIG. 17B (solid line), and the temperature detection signal 72 (signal at the point Z in FIG. 16) has a negative slope with respect to the temperature as illustrated in FIG. 17C, the temperature detection signal 72 is input to the adder 397 via the variable gain amplifier 396 (i.e., the temperature detection signal 72 is inverted in polarity, and then added to the vibration leakage signal 36b by the adder 397). The vibration leakage signal 36b (signal at the point N in FIG. 16) thus has temperature characteristics illustrated in FIG. 15D (i.e., the first-order component (broken line in FIG. 17D) of the temperature characteristics of the vibration leakage signal 36b approaches the first-order component (broken line in FIG. 17A) of the temperature characteristics of the angular velocity signal 36a (signal at the point H in FIG. 16)). The angular velocity signal 36a (signal at the point H in FIG. 16) and the vibration leakage signal 39b (signal at the point N in FIG. 16) are then input to the adder-subtractor circuit 370, so that the angular velocity signal 37 (signal at the point L in FIG. 16) having almost flat temperature characteristics (see FIG. 17E) is generated.

According to the angular velocity detection apparatus according to the third embodiment, even if the first-order component of the temperature characteristics of the angular velocity signal 36a differs from the first-order component of the temperature characteristics of the vibration leakage signal 36b, the first-order component of the temperature characteristics of the vibration leakage signal 36b can be adjusted to approach (ideally coincide with) the first-order component of the temperature characteristics of the angular velocity signal 36a using the first-order temperature adjustment circuit 392, and the temperature characteristics of the angular velocity signal can then be corrected by the adder-subtractor circuit 370. This makes it possible to correct various combinations of the first-order component of the temperature characteristics of the angular velocity signal 36a and the first-order component of the temperature characteristics of the vibration leakage signal 36b as compared with the first embodiment.

In FIG. 16, the first-order temperature adjustment circuit 392 may be disposed between the synchronous detection circuit 352 and the integration circuit 362. The first-order temperature adjustment circuit 392 may be disposed between the integration circuit 360 and the adder-subtractor circuit 370, or disposed between the synchronous detection circuit 350 and the integration circuit 360 so that the first-order component of the temperature characteristics of the angular velocity signal approaches the first-order component of the temperature characteristics of the vibration leakage signal.

1-4. Fourth Embodiment

Figure 18:
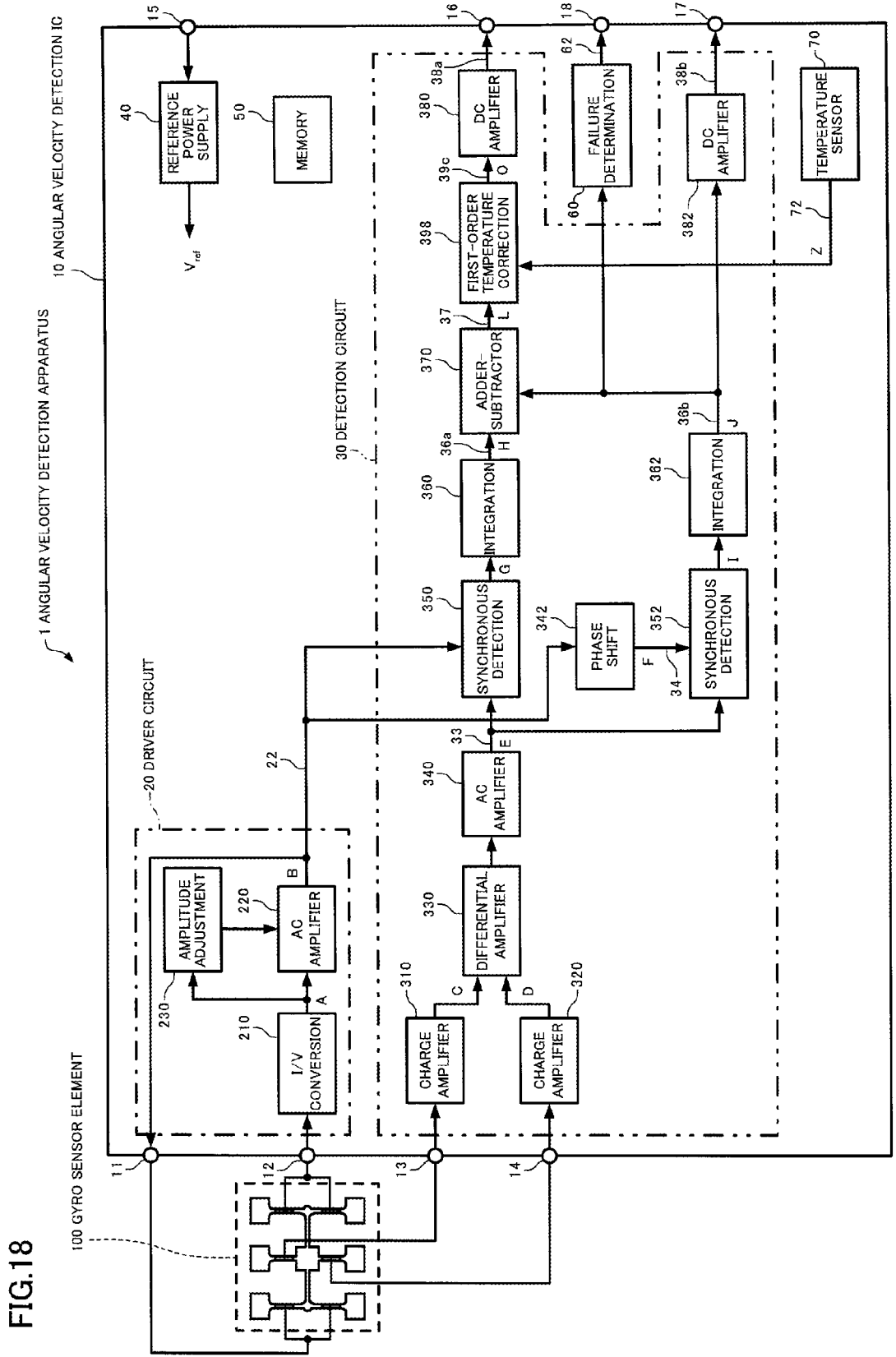
FIG. 18 is a diagram illustrating a configuration example of an angular velocity detection apparatus according to a fourth embodiment of the invention.

FIG. 18 is a diagram illustrating a configuration example of an angular velocity detection apparatus according to a fourth embodiment of the invention. In FIG. 18, the same sections as those illustrated in FIG. 13 are indicated by the same symbols. Description of these sections is omitted.

An angular velocity detection apparatus 1 according to the fourth embodiment differs from the configuration illustrated in FIG. 13 in that the first-order temperature adjustment circuits 390 and 392 are omitted, and a first-order temperature correction circuit 398 is added in the subsequent stage of the adder-subtractor circuit 370. The first-order temperature correction circuit 398 corrects the first-order component of the temperature characteristics of the angular velocity signal 37 based on the temperature detection signal 72. The first-order temperature correction circuit 398 may be configured in the same manner as in FIG. 14. The first-order temperature correction circuit 398 functions as a first-order temperature correction section.

Figure 19:
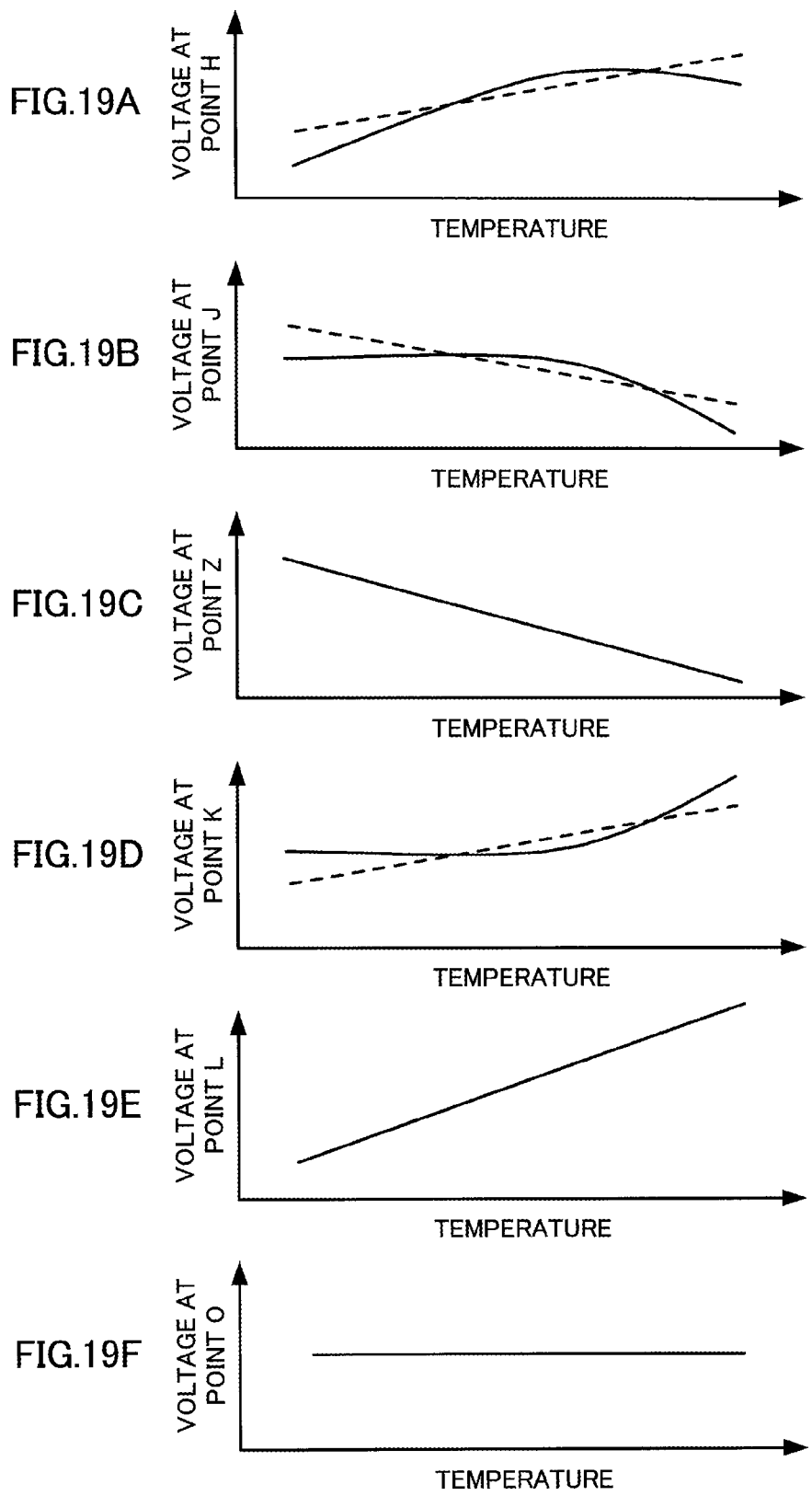
FIGS. 19A to 19F are graphs illustrating an example of correction of the temperature characteristics of an angular velocity signal according to the fourth embodiment.

When the angular velocity signal 36a (signal at the point H in FIG. 18) has temperature characteristics illustrated in FIG. 19A (solid line), the vibration leakage signal 36b (signal at the point J in FIG. 18) has temperature characteristics illustrated in FIG. 19B (solid line), and the temperature detection signal 72 (signal at the point Z in FIG. 18) has a negative slope with respect to the temperature as illustrated in FIG. 19C, the vibration leakage signal 36b is directly input to the variable gain amplifier 376. Therefore, the signal output from the variable gain amplifier 376 (output signal at the point K in FIG. 19) has temperature characteristics illustrated in FIG. 19D (i.e., the temperature characteristics of the vibration leakage signal 36b (FIG. 19B) that have been inverted in polarity, and amplified or attenuated based on the gain of the variable gain amplifier 376). Accordingly, the angular velocity signal 37 (output signal at the point L in FIGS. 1 and 9) obtained by adding the angular velocity signal 36a to the signal output from the variable gain amplifier 376 using the adder 378 has temperature characteristics illustrated in FIG. 19E (i.e., second and higher order components are almost canceled while the first-order component remains). The angular velocity signal 39c (signal at the point O in FIG. 18) obtained by correcting the first-order component of the temperature characteristics of the angular velocity signal 37 using the first-order temperature correction circuit 398 has almost flat temperature characteristics illustrated in FIG. 19F.

According to the angular velocity detection apparatus according to the fourth embodiment, even if the first-order component of the temperature characteristics of the angular velocity signal 36a differs from the first-order component of the temperature characteristics of the vibration leakage signal 36b, the first-order component of the temperature characteristics of the angular velocity signal that still remains uncorrected after temperature correction by the adder-subtractor circuit 370 can be corrected by the first-order temperature correction circuit 398. This makes it possible to correct various combinations of the first-order component of the temperature characteristics of the angular velocity signal 36a and the first-order component of the temperature characteristics of the vibration leakage signal 36b as compared with the first embodiment.

2. Electronic Instrument

Figure 20:
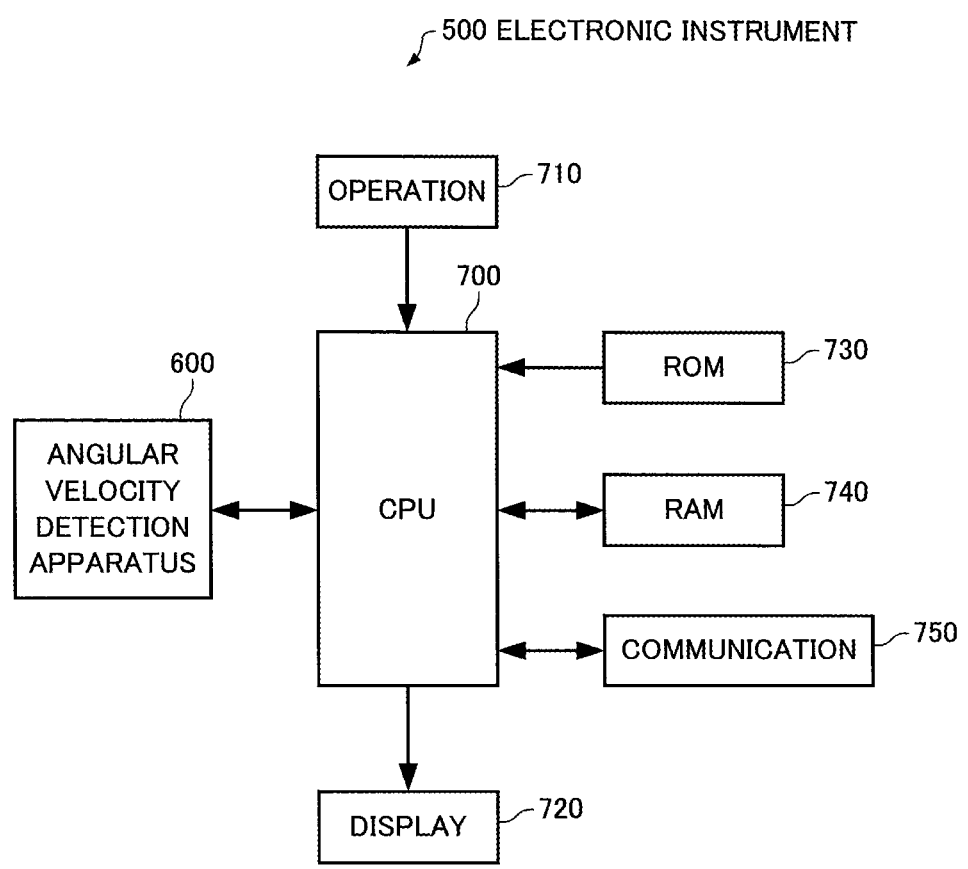
FIG. 20 is a functional block diagram of an electronic instrument.

FIG. 20 is a functional block diagram illustrating a configuration example of an electronic instrument according to one embodiment of the invention. An electronic instrument 500 according to this embodiment includes an angular velocity detection apparatus 600, a CPU 700, an operation section 710, a display section 720, a read-only memory (ROM) 730, a random access memory (RAM) 740, and a communication section 750. Note that the electronic instrument according to this embodiment may have a configuration in which some of the elements (sections) illustrated in FIG. 20 are omitted, or other elements are additionally provided.

The angular velocity detection apparatus 600 generates an angular velocity signal having a voltage corresponding to the angular velocity, and outputs the angular velocity signal to the CPU 700. The angular velocity detection apparatus 600 may generate a vibration leakage signal having a voltage corresponding to the magnitude of vibration leakage due to excited vibrations of a vibrator, and may output the vibration leakage signal to the CPU 700.

The CPU 700 performs a calculation process and a control process based on a program stored in the ROM 730. Specifically, the CPU 700 controls the angular velocity detection apparatus 600, or receives the angular velocity signal or the like from the angular velocity detection apparatus 600, and performs a calculation process. The CPU 700 performs a process corresponding to an operation signal from the operation section 710, transmits a display signal for displaying information on the display section 720, and controls the communication section 750 performing data communication with the outside, for example.

The operation section 710 is an input device including an operation key, a button switch, and the like, and outputs an operation signal based on an operation performed by the user to the CPU 700.

The display section 720 is a display device such as a liquid crystal display (LCD), and displays information based on the display signal input from the CPU 700.

The ROM 730 stores a program that causes the CPU 700 to perform a calculation process and a control process, a program that implements a navigation function or the like, data, and the like.

The RAM 740 is used as a work area for the CPU 700. The RAM 740 temporarily stores a program and data read from the ROM 730, data input from the operation section 710, the results of calculations performed by the CPU 700 based on a program, and the like.

The communication section 750 performs a control process that implements data communication between the CPU 700 and an external device.

A process with relatively high accuracy can be implemented at low cost by incorporating the angular velocity detection apparatus according to any of the above embodiments in the electronic instrument 500 as the angular velocity detection apparatus 600.

The electronic instrument 600 may be an arbitrary electronic instrument that utilizes the angular velocity detection apparatus. For example, the electronic instrument 600 may be a vehicular antiskid brake system, a vehicular overturn detection apparatus, a mobile phone, a navigation system, a pointing device such as a mouse, a digital camera, a game controller, or the like.

The invention is not limited to the above embodiments. Various modifications and variations may be made without departing from the scope of the invention.

The invention includes various other configurations substantially the same as the configurations described in connection with the above embodiments (e.g., a configuration having the same function, method, and results, or a configuration having the same objective and effects). The invention also includes a configuration in which an unsubstantial section (element) described in connection with the above embodiments is replaced by another section (element). The invention also includes a configuration having the same effects as those of the configurations described in connection with the above embodiments, or a configuration capable of achieving the same objective as that of the configurations described in connection with the above embodiments. The invention also includes a configuration in which a known technique is added to the configurations described in connection with the above embodiments.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An angular velocity detection apparatus comprising:
a vibrator that generates a signal that includes an angular velocity component corresponding to a magnitude of an angular velocity, and a vibration leakage component of vibrations based on a drive signal;
a driver section that generates the drive signal, and supplies the drive signal to the vibrator;
an angular velocity signal generation section that extracts the angular velocity component from the signal generated by the vibrator, and generates an angular velocity signal corresponding to the magnitude of the angular velocity;
a vibration leakage signal generation section that extracts the vibration leakage component from the signal generated by the vibrator, and generates a vibration leakage signal corresponding to a magnitude of the vibration leakage; and
an adder-subtractor section that adds the vibration leakage signal to the angular velocity signal, or subtracts the vibration leakage signal from the angular velocity signal, in a given ratio to correct temperature characteristics of the angular velocity signal.

2. The angular velocity detection apparatus as defined in claim 1, further comprising:
a first first-order temperature adjustment section that adjusts a first-order component of the temperature characteristics of the angular velocity signal input to the adder-subtractor section to approach a first value; and
a second first-order temperature adjustment section that adjusts a first-order component of temperature characteristics of the vibration leakage signal input to the adder-subtractor section to approach a second value.

3. The angular velocity detection apparatus as defined in claim 1, further comprising:
a first-order temperature adjustment section that adjusts one of a first-order component of the temperature characteristics of the angular velocity signal input to the adder-subtractor section and a first-order component of temperature characteristics of the vibration leakage signal input to the adder-subtractor section to approach the other of the first-order component of the temperature characteristics of the angular velocity signal and the first-order component of the temperature characteristics of the vibration leakage signal.

4. The angular velocity detection apparatus as defined in claim 1, further comprising:
a first-order temperature correction section that corrects a first-order component of temperature characteristics of a signal obtained by the adder-subtractor section.

5. The angular velocity detection apparatus as defined in claim 1, further comprising:
a terminal that outputs a signal based on the vibration leakage signal to the outside.

6. The angular velocity detection apparatus as defined in claim 1, further comprising:
a failure determination section that determines the presence or absence of failure of the angular velocity detection apparatus based on the vibration leakage signal.

7. The angular velocity detection apparatus as defined in claim 1,
the adder-subtractor section including an inverting amplifier that inverts a polarity of an input signal, a switch circuit that selects whether or not to bypass the inverting amplifier, and a variable gain amplifier that is disposed in series with the inverting amplifier, and amplifies or attenuates an input signal by a gain that can be variably set, the adder-subtractor section selecting whether or not to add a signal obtained by inverting a polarity of the vibration leakage signal to the angular velocity signal using the inverting amplifier and the switch circuit, and selecting a ratio of the vibration leakage signal added to the angular velocity signal using the variable gain amplifier.

8. An electronic instrument comprising the angular velocity detection apparatus as defined in claim 1.

* * * * *